(12) United States Patent
Ashkenazi et al.

(10) Patent No.: US 8,935,673 B1
(45) Date of Patent: Jan. 13, 2015

(54) SYSTEM AND METHOD FOR DEBUGGING COMPUTER PROGRAM BASED ON EXECUTION HISTORY

(71) Applicant: Cadence Design Systems, Inc., San Jose, CA (US)

(72) Inventors: Yonatan Ashkenazi, Rehovot (IL); Nadav Chazan, Ness Ziona (IL); Tal Tabakman, Tel Aviv (IL); Yaron Peri-Glass, Ra'Anana (IL); Ronen Shoham, Austin, TX (US)

(73) Assignee: Cadence Design Systems, Inc., San Jose, CA (US)

(*) Notice: Subject to any disclaimer, the term of this patent is extended or adjusted under 35 U.S.C. 154(b) by 168 days.

(21) Appl. No.: 13/691,155

(22) Filed: Nov. 30, 2012

(51) Int. Cl.
| | |
|---|---|
| G06F 11/30 | (2006.01) |
| G06F 3/00 | (2006.01) |
| G06F 9/44 | (2006.01) |
| G06F 11/00 | (2006.01) |
| G06F 12/14 | (2006.01) |
| G06F 12/16 | (2006.01) |
| G06F 11/36 | (2006.01) |

(52) U.S. Cl.
CPC .................................. *G06F 11/3656* (2013.01)
USPC ........... 717/125; 702/186; 715/700; 715/711; 717/100; 717/116; 717/124; 717/128; 717/130; 717/131; 726/25

(58) Field of Classification Search
CPC ............... G06F 8/24; G06F 8/41; G06F 8/48; G06F 8/313; G06F 11/362; G06F 11/3466; G06F 11/3612; G06F 11/3664; G06F 11/3636; G06F 11/36; G06F 11/3644
See application file for complete search history.

(56) References Cited

U.S. PATENT DOCUMENTS

| | | | | |
|---|---|---|---|---|
| 5,410,648 | A * | 4/1995 | Pazel | 717/124 |
| 7,426,717 | B1 * | 9/2008 | Schang et al. | 717/124 |
| 7,434,207 | B2 * | 10/2008 | Spencer | 717/125 |
| 7,979,847 | B2 * | 7/2011 | Danton et al. | 717/125 |
| 8,281,242 | B2 * | 10/2012 | Gomes et al. | 715/711 |
| 2003/0204374 | A1 * | 10/2003 | Madsen et al. | 702/186 |
| 2004/0006760 | A1 * | 1/2004 | Gove et al. | 717/100 |
| 2004/0172623 | A1 * | 9/2004 | Eckels et al. | 717/125 |
| 2005/0246690 | A1 * | 11/2005 | Horton et al. | 717/125 |
| 2006/0059470 | A1 * | 3/2006 | Kurapati | 717/128 |

(Continued)

OTHER PUBLICATIONS

"chronon DVR for Java—Tool for Java Logging and Java Debugging, Integrates with Eclipse Debugger and Eclipse Remote Debugger Chronon Systems"; http://www.chrononrecorder.com/products/chronon-time-travelling-debugger/; downloaded Oct. 4, 2012.

*Primary Examiner* — Don Wong
*Assistant Examiner* — Anibal Rivera
(74) *Attorney, Agent, or Firm* — Rosenberg, Klein & Lee

(57) ABSTRACT

A system and method are provided for enhanced navigation along execution time and code space in a debugger to assist a user in remediating errors, streamlining, or reverse engineering a computer program and the source code thereof. Snapshots of system states are recorded, a causality tree of commands is constructed through execution of the program to be debugged, and an intelligent display of system states captured during runtime and indexed or cross-referenced by time are displayed to the user in an intelligent manner to aid the user with certain debugging tasks. Additionally, further features in assisting the user to locate a root cause of an error or unexpected value and remediate that cause are also provided.

23 Claims, 18 Drawing Sheets

```
generate_parity() is {
    parity = calculate_parity();
};                                          103
calculate_parity():byte is {
    if (parity_enabled()) then {       104
        for i from 0 to 3 {
            result ^= data[7+8*i:0+8*i];
        };
    } else {                   105
        result = 0;
    };
};

channel: bit;

parity_enabled() : bool is empty;        102 check_parity() is {                  106
    var calculated_parity := calculate_parity();
    if (calculated_parity != parity) {
        dut_error("recieved transfer with wrong parity");
    };
};
```

(56) References Cited

U.S. PATENT DOCUMENTS

| | | | |
|---|---|---|---|
| 2006/0242174 A1* | 10/2006 | Tsyganskiy et al. | 707/100 |
| 2006/0293940 A1* | 12/2006 | Tsyganskiy et al. | 705/8 |
| 2006/0294158 A1* | 12/2006 | Tsyganskiy et al. | 707/202 |
| 2007/0006154 A1* | 1/2007 | Yang et al. | 717/124 |
| 2007/0294671 A1* | 12/2007 | Demetriou et al. | 717/124 |
| 2008/0066055 A1* | 3/2008 | Shebs | 717/124 |
| 2008/0244516 A1* | 10/2008 | Meijer et al. | 717/116 |
| 2009/0089756 A1* | 4/2009 | Danton et al. | 717/124 |
| 2009/0254821 A1* | 10/2009 | Cates | 715/700 |
| 2009/0319995 A1* | 12/2009 | Gawor et al. | 717/125 |
| 2010/0050159 A1* | 2/2010 | Daniel | 717/125 |
| 2011/0055815 A1* | 3/2011 | Squillace | 717/125 |
| 2012/0102463 A1* | 4/2012 | Bates | 717/125 |
| 2012/0151453 A1* | 6/2012 | Finking et al. | 717/130 |
| 2012/0167057 A1* | 6/2012 | Schmich et al. | 717/130 |
| 2012/0260344 A1* | 10/2012 | Maor et al. | 726/25 |
| 2013/0047169 A1* | 2/2013 | Gagliardi et al. | 719/317 |
| 2014/0033183 A1* | 1/2014 | Brown | 717/131 |

* cited by examiner

```
generate_parity() is {
    parity = calculate_parity();
};
calculate_parity():byte is {            ~103
    if (parity_enabled()) then {        ~104
        for i from 0 to 3 {
            result ^= data[7+8*i:0+8*i];
        };                    ~105
    } else {
        result = 0;
    };
};

channel: bit;

parity_enabled() : bool is empty;       102 check_parity() is {                              106
    var calculated_parity := calculate_parity();
    if (calculated_parity != parity) {
        dut_error("recieved transfer with Wrong Parity");
    };
};
```

FIG. 1

```
!parity: byte;
generate_parity() is {
    parity = calculate_parity();
};

calculate_parity():byte is {
    if (parity_enabled()) then {
        for i from 0 to 3 {
            result ^= data[7+8*i:0+8*i];
        };
    } else {
        result = 0;
    };
};

channel: bit;
```

```
generate_parity() is {
    parity = calculate_parity();
};
calculate_parity():byte is {
    if (parity_enabled()) then {
        for i from 0 to 3 {
            result ^= data[7+8*i:0+8*i];
        };
    } else {
        result = 0;
    };
};

channel: bit;

parity_enabled() : bool is empty;

check_parity() is {
    var calculated_parity := calculate_parity();
    if (calculated_parity != parity) {
        dut_error("recieved transfer with Wrong Parity");
    };
};
};
```

Reached DUT-Error #1

Cause — 640

- [610000000] Reached If (line 52). Why? — 641
  - [610000000] Reached Method-Call check_parity(). Why? — 642
    - [50000000] Reached While (line 52). Why? — 643
      - [     0] Reached Method-Call collect_master_transfers()
      - [50000000] Value-of Condition = TRUE
    - [610000000] Value-of Condition = TRUE. Why? — 644
      - [610000000] Value-of calculated_parity = 0xa5. Why? — 645
        - [610000000] Result-of calculate_parity() = 0xa5. Why? — 646
          - [610000000] Value-of i = 0x3
          - [610000000] Value-of result = 0x8e. Why? — 647
            - [610000000] Value-of i = 0x2
            - [610000000] Value-of result = 0x53. Why? — 648
              - [610000000] Value-of i = 0x1
              - [610000000] Value-of result = 0xe8. Why?
              - [610000000] Value-of data = 0x2bddbbe8. Why? — 649
              - [610000000] Reached For (line 37). Why?
            - [610000000] Value-of data = 0x2bddbbe8. Why?
            - [610000000] Reached For (line 37). Why?
          - [610000000] Value-of data = 0x2bddbbe8. Why? — 650
            - 651 — [  static] Bound Port p_smp.port_data$ ⟷ m_data
            - 652 — [591000000] Value-of m_data = 0x2bddbbe8. Why?
          - [50000000] Reached While (line 52). Why?
            - [50000000] Value-of Condition = TRUE
          - [610000000] Reached For (line 37). Why?

| id number 802 | Kind 804 | Path 806 | Value 808 | Line number 810 |
|---|---|---|---|---|
| 705 | Starting Method | Foo | | 1 |
| 706 | assignment | X | 5 | 2 |
| 707 | Method call | Goo | | 3 |
| 708 | Starting Method | Goo | | 8 |
| 709 | return | | 6 | |
| 710 | assignment | y | 11 | 3 |
| 711 | If statement | | True | 4 |
| 712 | Dut_error | | | 5 |

FIG.8

SYSTEM AND METHOD FOR DEBUGGING COMPUTER PROGRAM BASED ON EXECUTION HISTORY

The subject system and method are generally directed to providing for enhanced debugging of a computer program. The subject system and method generally provide for enhanced navigation, viewing, and remediation of errors in a source code of a computer program. The subject system and method also generally provide for both execution time and code space-based navigation of a source code and execution history of that source code.

As computer programs for various applications, such as, operating systems, control systems, testing suites, hardware verification environments, and the like are becoming increasingly sophisticated and feature-rich, the source code defining those computer programs are becoming much more complex and intricate. Effectively navigating through source code, locating errors, determining the causes for the errors, and remediating those errors, as well as streamlining a program to be more efficient, or reverse engineering such a computer program, amongst other tasks, are becoming increasingly difficult, time consuming, and expensive. Computer programs defined by millions of lines of source code (often times in several different programming languages) are becoming common. Navigation through such code, traversal through function calls, dealing with parallelism and race conditions, and customized memory structures, amongst other issues, are becoming increasingly difficult to properly track.

Such computer programs may be concurrently executed with a massive scale of parallelism on server farms comprising numerous independently functioning servers, processors, cores, memory banks, and storage. Indeed, plural geographically distant server farms or clusters are in certain cases employed in the running of just one program, thereby severely complicating debugging, streamlining, and source code management. Still further, several versions of a particular program source code may all need to be concurrently maintained with changes, updates, bug-fixes, and the like, being separately applied by numerous collaborative programmers. As crowd-sourcing and distributed code changes increase and the number of hardware ecosystems and the like continue to diversify, these problems are only exacerbated. Thus, it is seen that the need for effective navigation, error determination, and remediation measures is becoming increasingly essential.

There is therefore a need for a system and method for providing enhanced navigation and debugging of source code of a computer program.

SUMMARY OF THE INVENTION

It is an object of the present invention to provide a system and method for debugging source code of a computer program based on an execution history thereof.

It is an object of the present invention to provide enhanced navigation for a computer program debugger.

It is yet another object of the present invention to provide a system and method for both time and spatial traversal or navigation of a source code in a computer debugger.

These and other objects are attained in a method for debugging source code of a computer program based on an execution history thereof. The method includes establishing a computer program defined by source code including a plurality of command lines and actuating a processor to sequentially execute the command lines to generate runtime data. The runtime data is captured into a memory. The runtime data includes an execution history of at least one command and runtime values related thereto. A user interface is actuated to display a spatial listing of at least a portion of the source code and a graphic display is automatically generated corresponding to at least one of runtime values responsive to user selection of at least one of the command lines. The graphic display includes at least a portion of the execution history of runtime values—whereby the user selected command line of source code is selectively cross-referenced in time to the runtime values set thereby.

In certain embodiments a method for debugging source code of a computer program based on an execution history thereof includes establishing a computer program defined by source code including a plurality of commands. A processor coupled to a memory is established. A computer program defined by source code including a plurality of commands is established in said memory. The processor is actuated to execute at least a portion of the commands to generate runtime data. The runtime data is captured into the memory. The runtime data includes an execution history of at least a set of commands. A user interface is actuated to display a spatial listing of at least a portion of the source code. A composite display is generated to include the spatial listing of the portion of source code with a plurality of time-based indicia of the execution history respectively corresponding to the commands in the portion of the source code displayed.

A system for debugging source code of a computer program based on an execution history thereof includes a memory having stored therein a computer program defined by source code. The source code includes a plurality of command lines. A processor is coupled to the memory. The processor sequentially executes the command lines to generate runtime data and capture the runtime data in the memory. The runtime data includes an execution history of runtime values for a plurality of program variables. A user interface is coupled to the processor to generate a display including spatial listing of at least a portion of the source code; at least one of the program variables responsive to user selection of at least one command line; and, at least a portion of the execution history of runtime values for the displayed program variable. The user selected command line of the source code is selectively cross-referenced in time to the runtime values for the program variable set thereby.

Additional aspects and details will be set forth in part in the Description which follows, and, in part, will be apparent from the Description and Figures.

BRIEF DESCRIPTION OF THE DRAWINGS

FIG. 1 is a simplified exemplary display of a source code in a debugger;

FIG. 2A is an exemplary screen shot of a debugger with enhanced navigation in accordance with one exemplary embodiment of the present invention;

FIG. 2B is a screen shot of a choose execution window of the enhanced debugger in accordance with one exemplary embodiment of the present invention;

FIG. 3 is another screen shot of some of the enhanced navigation features in accordance with certain exemplary embodiments of the present invention;

FIG. 4 is yet another screen shot of a user interface in accordance with one exemplary embodiment of the present invention;

FIG. 5 is another exemplary user interface illustrating a source code with enhanced navigation in accordance with an exemplary embodiment of the present invention;

FIG. 6 is yet another screen shot in accordance with another exemplary embodiment of the present invention;

FIG. 7 is another screen shot of a user interface in accordance with an exemplary embodiment of the present invention;

FIG. 8 is an exemplary catalog of system parameter snapshots in accordance with an exemplary embodiment of the present invention;

DETAILED DESCRIPTION OF THE PREFERRED EMBODIMENTS

Figure 9:
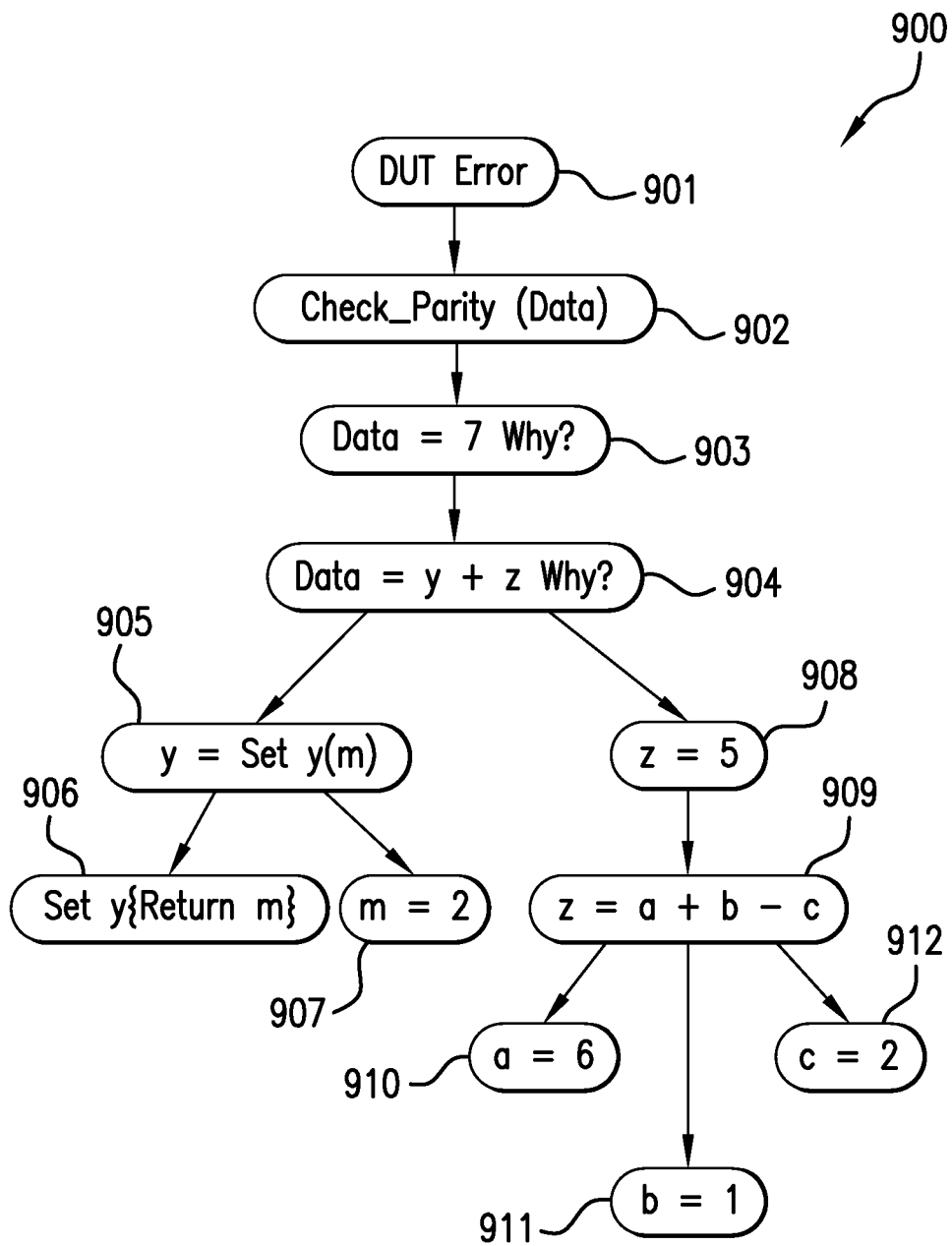
FIG. 9 is a simplified exemplary causality tree created in accordance with an exemplary embodiment of the present invention.

One example of the system and method realized in accordance with the disclosed embodiment seeks to provide a method for debugging source code of a computer program based on an execution history thereof. Another example of the system and method realized in accordance with the present invention seeks to provide both time and spatial navigation of a source code and program execution history. A debugger is provided with enhanced navigation features allowing traversal through source code based on selection from the ordered spatial arrangement of command lines for the given code or based upon execution times derived from the code's execution, amongst other features.

Navigation in a debugger may be thought of as changing the visible portion of source code, the selected portion, the portion under review or modification, or the scope of the program or execution time that is being run and/or debugged. Navigation allows for a user to follow a logical spatial code path or an actual historical time-based path through executions of the source code. The scope may be, for example, a functional block module, a function call, an object or structure including variables and functions thereof, a line of code, or any portion of source code or execution time/path. A plurality of source files, libraries, or execution paths may be concurrently displayed. Generally, when a specific error in a computer program is being remediated or a functional block is being addressed, the scope of a debugger should be narrowly tailored to match the area of interest for a debugger—generally, the portion or portions most likely to have caused or contributed to the error (as a plurality of causes may act in concert—serially or in parallel to result in an error) and/or the portion where the error manifests itself.

While previous tools have attempted to address navigation and debugging issues, no tools heretofore known provide suitable navigation and debugging measures especially in both execution time and code space. In the past, a user may have been presented with limited navigation measures such as the "step" function which allows a user to get to the next command execution from the one that they are currently on. Therefore, if, for example, a user is examining line 10 of a source code, potentially the step function may take them to a command on line 11. If the user runs a step function in a line with a method call, the debugger generally steps into that method. The "step over" command takes the user to the next command within the currently selected scope. The step-over command may thereby ignore such a method call as previously described and instead jump to the next command after the method. The "step-out" command may take the user to the next command immediately after the current method or scope is terminated.

Another measure put forth to address the navigation issue is the use of "break points." Break points allow the user to manually insert a marker or stop point within a source code. When the source code is then run, the execution of the computer program will cease at the point at which the break command is placed. For example, the user might say: "I want to stop the next time that line X in file Y is executed." The program is then run until one of the break points have been met and then the execution is arrested and a user is generally presented with a visual debugger and a listing of the source code with the visual indicia of the point at which the break point arrested execution. At this point, a user may generally inspect certain parameters.

A further tool is a "conditional break point" where a user may, rather than merely stating a location of a break point, also attach a condition to the break point. In this instance, the execution of the program would not stop each time it meets the break point promiscuously, but would instead evaluate a condition that a user has specified. For example, the user may state: "Break at this line in this file if the value of X is greater than 7." As another example, a user may be able to specify: "Stop the next time line X in file Y is executed, but only if packet.data==calculate_data." Such a break point would then cause the debugger to evaluate the expressed condition for each time the line X in file Y is executed. In other words, the packet.data variable would be evaluated or compared to the calculate_data or function for equality. Only where there is identity between the packet.data variable and the calculate_data function/variable would the break point then actually arrest execution. Yet another break point feature is the "break on change" feature. When a user sets a break on change break point, a user may select a specific object or field thereof such as a variable or parameter and ask the debugger to stop and arrest execution upon any change in a value thereof.

While standard debuggers generally allow the break point feature-set discussed above, reverse debuggers (sometimes called post-mortem debuggers) generally provide more features, such as ability to "back step." The back step function allows a user to step back one command at a time. Therefore, the analogs of step into, step over, and step out, now may allow for back into, back over, and back out, which would perform similar actions, only backwards.

Yet another capability that a reverse debugger may provide is a "go-to-cause feature." By way of introduction, FIG. 1 shows a source code of a program. While the instant location, scope, or selected command may be line 53 where an error function has been triggered, the user may seek to find out why the error condition was triggered. Essentially, the go-to-cause function evaluates and gives the user a basic limited reason why. Such an exemplary go-to-cause feature may provide the user with two exemplary causes. The first: because the program reached the "if" statement at line 52 and secondly: because the condition in the if statement was evaluated to be true. Each such answer is referred to as a cause. A go-to-cause navigation tool may then show both answers or a plurality of answers to the user and allow him or her to go to one of the causes and continue to traverse iteratively upon each cause.

Upon selecting one of the causes, the scope of the debugger may change to reflect the moment of execution when the cause occurred. If, for example, the user selected the second cause, the user may be led, or the scope changed, to line 52. Now two new causes may be provided where the new question may be: "why is calculated_parity not equal to parity?" The go to cause tool may then provide two exemplary answers: first: because the calculated_parity=0xa5 and secondly: because parity=0x85. Thereby, it is seen that "0xa5" is not equal to "0x85." This non-identity between calculated_parity and parity triggered the positive evaluation of the condition in line 52. If the user then selected the first cause, the scope may be changed to line 51 where the calculated_parity is assigned a value of a function called calculate_parity( ). Contrastingly, the second cause would take the user to an entirely different scope, potentially in a different file and time to where parity was assigned a value somewhere completely different. Generally, this paradigm leads to a host of causes which exponentially grow to include an unmanageable number of causes requiring a user to exercise discretion and their pre-existing knowledge of the program or source code to eventually discern the problem or root cause- or give up and revert to break points and other tools to narrow down a location of the root problem.

As seen in the illustrative source code of FIG. 1, a portion of source code 100 includes a plurality of lines of commands. Each line is preferably provided with a line number indicator 101 seen on the left hand side of the Figure, sequentially listing each line. An exemplary command line 103 may declare a function such as "calculate_parity( )" or, alternatively, include a call to a calculate_parity( ) function call which may return a value or perform a computation. A repeating, looping, or iterating command 104 "for i from 0 to 3" is provided which will iterate three times executing a command 105 "result^=" which assigns a value, such as, for example "5," "0x228b2332," and the like into a variable result which is stored in a portion of memory. Thereby, the looping command 104 ensures that the command 105 is executed a plurality of times. While the source appears linear and sequential and appears to only show one instance of the result 105 command, it is actually seen that due to the "for" iterative looping command 104, the command 105 is executed a plurality of iterations or executions. Conventional source code debuggers generally do not provide suitable measures for addressing a plurality of executions of a single line of source code.

Another exemplary command 102 is the "VAR calculated_parity:=calculate_parity( )" command. This exemplary command may instantiate a variable "calculated_parity" and perform an assignment based upon the returned result of a calculate_parity function. This exemplary line 51 shows that the execution of source code is not necessarily linear in that while line 51 is executed, line 52 is not necessarily sequentially executed. In this instance, the command 102 executes a calculate_parity( ) function which may be defined elsewhere, such as seen at line 35. Therefore, execution of the portion of source code seen may jump from line 51 to line 35 through line 43 and then return to line 51 followed by line 52. Such seemingly haphazard execution complicates spatial code navigation and execution time-based navigation.

Yet another exemplary portion is line 53 where a DUT_error 106 is triggered. The line 53 DUT_error 106 is triggered if the command at 52 is evaluated as true. The DUT_error routine may be defined elsewhere, potentially in a library, or entirely different file of source code.

As seen in the exemplary screen shot of FIG. 2A, an example of an enhanced debugger with both time and space navigation capabilities 200 provides for a spatial indicia 201 indicating a line number or spatial arrangement of source code. In this instance, the indicia 201 includes sequential line numbers "31, 32, . . . , 46." Each command line or line of commands is given a line number 201. While the exemplary debugger 200 is being used, a user may navigate through the source code lines in a spatial manner and the executions of the commands therein in a time-based manner.

A user may spatially select a line or command of source code such as selected line 214 which has spatial indicia "38." The currently selected line is preferably colored, indicated, or highlighted a distinctive color apart from the remainder of the lines of source code. For example, line 38, the selected command 214, may be highlighted a yellow color or any other color or indicia which sets it apart from the other lines of code. By selecting a line of code such as line 214, a user may set an initial scope of the current operation. However, it bears noting that each line of code may be executed a plurality of times. Therefore, if the user wishes to select a different execution other than an initial one, a degree of time-based navigation may be required as well. For example, initially, if a user selects a line of code, this may set a current_operation pointer or variable to be or point to the first or most recent execution of that command. The user is also provided navigation tools to navigate to preceding or succeeding executions of the current_operation.

In this instance, by selecting the command 214, the user has effectively selected a command within a method, function, or functional block. The method or functional block to which the selected command belongs is preferably denoted by another indicia, such as, for example, a contrasting background color. Here, it is seen that the "calculate_parity( )" function stretches from line 35 to line 43. The calculate_parity( ) function is illustratively denoted in this instance by a blue background color 206 to indicate which lines fall within the instantly selected method. A single line of code may have a plurality of commands therein and each command may have been executed a number of times throughout the execution of a program compiled from the source code. A user may select a line of source code as a starting point and then selectively choose an execution thereof or jump forwards or backwards to a respectively succeeding or preceding execution.

Additionally, when a specific execution of a command such as 214 is selected, the other lines of code in the source code are evaluated based upon their execution times or relative execution sequence during a captured execution of at least a portion of a program defined by the source code. In some instances, the source code is a scripting language which is never compiled and executed per se, but rather, the commands (such as, for example, java script) may be thought of as an executable in the interest of brevity.

While the computer program defined by the source code or script is executing, the debugger receives notifications after every action, command, or operation is executed. Such notifications may take the form of system snapshots or records. Each notification may be parsed to extract system state information to be placed as a record entry into a database or catalog of system snapshots, such as seen in FIG. 8. Each record entry may include many fields that may later be used to display system states, variable values, and the like. Additionally, such record entries may be used to generate the causality tree as seen in FIG. 9.

As an example of execution relation indicia, it is seen that while line 38 is currently selected, line 33 discloses a backward facing arrow 208. The backward facing arrow 208 is merely illustrative; the geometric shapes shown, namely, the graphic arrows are but examples. Any indicia suitable for a given application may be used for these purposes. The exemplary arrow serves as an indicia that the command on line 33 has been executed previous to the selected execution of the command 214 on line 38. This indicia also is user selectable. For example, a user may click on the rearward facing indicia 208 and be taken to a previous execution of the command of line 33. Again, it is important to note that while the spatial arrangement of code may indicate a single line of code, that line of code may be executed a plurality of times throughout the execution of a program defined by the source code. Indeed, in some programs such as server daemons, print spoolers, web services and the like, an endless or perpetual loop is performed. In this instance, the command on line 33 has been executed prior to the selected command on line 38 including command 214.

A blank indicia 209 may indicate that the command on the line 33 has not been executed after the currently selected execution of the line of code. As another example, looking at the totality of the portion of source code, it is seen that line 33 has been executed before the currently selected execution as have lines 36, 37, and 38. The executions of a particular command are separate and distinct from the spatial layout of the commands as seen. Thus, it is seen that the command "result^=" has been executed a plurality of times and indeed has been executed previous to the currently selected execution and will be executed subsequent to the selected execution. Therefore, it is seen that while the rearward facing arrow 208 indicates that a particular line or command has been executed previous to a selected command, it is seen that a forward facing arrow such as arrow 210 may indicate that a command will be or is executed subsequent to the currently selected command. Further, the arrow indicia may be further distinguished, by color, shape, size, or the like. For example, a blue arrow may denote that the line will be or was executed within the current scope—meaning: in this call of the surrounding method. Contrastingly, a white arrow indicia denotes that the line will be/was executed but not in the current scope. This allows a user to understand what happened in this scope but also allows him to jump between scopes if he wants to (when the arrow indicia is a certain color, such as white.)

Additionally, a selectable indicia 212 which may be in an exemplary embodiment, another forward facing arrow, may allow a user to select a pre/post execution time of the current scope or selected line. Whereas most debuggers allow a user to stand solely in a pre-execution time, considering for example, at selected line number "38" 214, the debugger may be in a time immediately before the execution of that command. The execution time jump selectable indicia 212 may allow a user to constructively pretend that they have already completed the currently selected command. In other words, scope may remain at the selected line, but the result thereof is computed as if the line had already been executed. Such a feature may be beneficial especially in a return command where the execution is returning from a specific functional block or function and has not assigned a value to be returned to a variable, but is instead directly returning a variable to a main calling program, or to another function, or into an expression of a complicated calculation. In conventional debuggers, such constructive post-execution is not possible and capturing a value to be returned requires significant debugging coding actions as the post-executed values are never stored in a user-accessible variable or memory location.

When a user selects a line of source code or command such as line or command 214, an execution or a choose execution window may be displayed, such as the exemplary choose execution window of FIG. 2B. The exemplary choose execution window 2B is seen to include a plurality of executions including 214', 214", and 214''', amongst others. Each of these executions of the selected command 214 are executed independently and at distinctly different execution times. As the source code 200 in FIG. 2B includes a for loop surrounding command 214, it is seen that the command 214 is executed a plurality of times. Indeed, the calculate_parity( ) function may also be called a plurality of times and thereby the command 214 may be recursively executed quite a few times throughout the overall execution of a particular program.

To provide direct access to other executions of commands, for each command line of source code it is determined whether that line was executed before and/or after the currently selected operation or command line; and for each line of the current method, it is determined whether the line was executed in the current method call (again—before and/or after the currently selected operation).

While recording the runtime data or snapshots of the execution progress, information regarding when the first execution of a command or action within a line was performed and when the last execution was performed are stored into the database during the run or execution thereof as illustrated at FIG. 8. A hash table may be employed that holds entries for each execution of a command or action within a line of code. Whenever a command is being executed (one or more entries may be recorded in the database with its line number and file name), the hash table is evaluated—if the line+file is not present,—this means this is the first execution and a current id number corresponding to the entry being recorded in the database—is recorded as the first and last execution of that line+file. If the line+file was already in the hash table, the last execution is set to the current id number.

When the execution recording process is complete each line of code or command thereof has a corresponding cell in the hash table or database as seen in FIG. 8 including: an id number for the first execution and an id number for the last execution. Such an id number may be called the id number of the current_entry—current_id_number. To find which entries belong to the same operation, the limits of the operation are determined. To determine limits, the debugger may start from the current_entry corresponding with the user selected command line, and proceed to traverse until the first entry that is not in the operation. From the first entry not in the operation, a search is performed backwards to the first entry that is inside the operation. To find the first entry not in the operation, an entry in the same thread, in the same method (based on the first and last lines of the method), the call stack depth, and the object on which it was invoked—provide enough details to ensure that a found execution is outside the current operation if so intended. For the found execution to be valid, it will have a different line number than the currently selected command line and will be either smaller (backwards) or bigger (for a forward search). If the previous search doesn't work, due, perhaps to subtle issues with a specific programming language (such as E code not requiring all code to be in a particular method), a search is performed for the first record entry with a greater or smaller id number, having the same thread, but either a different line in the same stack call depth or has a lower stack depth. Once this is found, it may form the starting location for a forward or backward search depending on whether a previous or succeeding execution is of interest.

In order to determine whether a line was executed before the current_entry, the id number of the first execution of that line is checked to see if it is smaller than current_id_number. Correspondingly, to determine if a command line was executed after current_entry, the last id number of that line is checked to determine if it is bigger than the current_id_number.

When the line under evaluation is the same line of the current_entry, a more intelligent evaluation may be required. Assume, for example, that the current_id_number is 707 and a determination whether line 3 is executed later is under evaluation. The calculation presented above would find the entry with id number 710—but this entry is part of the same operation or command line itself. From the user point of view saying it is executed again later would be confusing. For that reason in this special case, a preferred measure for clarifying and meeting user expectations may be to use a function: get_last_entry_of same_operation( )—which would result with the entry with id num 710—and perform the calculation starting from there. The same applies for searching earlier executions—only this time use get_first_entry_of same_operation( ) and apply the calculation from there.

To find the execution history information only for lines inside the current method, the first and last execution of each such line (only inside the scope of the execution of the current method) is determined. Once an execution history (within the current method or function) is determined, the measures discussed above for determining execution history may be employed.

As an example, the current method's starting and ending line, the method_depth, the first id number of a line in the current execution (start_id) and the last id of a line in the current execution (finish_id) are all known from the database of FIG. 8. The database is then queried for each line—to find the first id number that is bigger than start_id, in that line, in that method_depth and in the same thread as current_entry. Also a query is performed for the first id_number that is smaller than finish_id, in that line and so on for each line in the method.

Inasmuch as a method usually consists of a few lines, and since the entries of a method are usually found at the same part of the database—this entire process of determining execution history relative to a selected command line is generally done in a short time. Therefore, performing such calculations dynamically, such as, for example, every time the debugger or user changes the current location and gets into a new method is possible without causing delays or the debugger becoming unresponsive. Additionally, the results may be cached to obviate needless recalculations for another entry in the same method. Once calculated, graphical indicia indicating a previous or succeeding execution are rendered and displayed for each command line in at least the visible portion of the source code. Such graphical indicia are able to be actuated by a user to change the scope of the debugger to directly navigate to a previous or succeeding execution of the command line of the actuated indicia. Additionally, graphical indicia indicating membership in a function or method are displayed as well.

The choose execution window 200' shows each of the plurality of executions of the selected command line 214. The window 200' may be any graphical arrangement such as a frame, a screen, a window, a terminal, a collection or windows, or the like as would be known to one of skill in the art. It is seen that a variety of characteristics related to the chosen command or selected line of source code are presented to a user to assist them debug, streamline, or reverse-engineer a program defined by source code.

A time column 216 describing a time of the execution based upon the system clock, a program clock, a simulation time, or the like, is provided. A thread ID, column 218 is provided which allows a debugger or programmer to determine which portion of the program, perhaps executing in parallel, executed the command 214. Additionally, an instance name, column 220, is provided which may allow for the determination of which portion of source code, device under test, or specifically constructed memory structure/object is being invoked. Additionally, responsive to a user selection of a line or command of source code such as line or command 214, the debugger may selectively determine which variables are related to or explicitly disclosed in the selected line 214. In this instance, the debugger has determined that a result variable, a data variable, and an i variable are all related to the selected line 214. It may be seen that the i variable has a column 222 sequentially listing and describing the values of that variable, in this instance, 0, 1, 2, 3. Such sequence of values of the variable i is to be expected when inspecting the source code 200 of FIG. 2A as the selected command 214 is surrounded by a for loop of 0 to 3.

Additionally, the data variable has been provided at column 224 responsive to the determination that the data variable is related to the selected line 214. Such determination may be made during a parsing, linking, compiling, during execution time, or thereafter, based upon symbolic references, literal names, memory references, pointers, or the like. Still further, such determination of relation may extend to functions, constants, pointers, objects, structs, and the like. After determining that the data variable is related to the selected line 214, the various values of the data variable at different execution times is listed in that column. The horizontal window control 227 indicates that a portion of the table continues, that there are additional columns of variables or parameters to the right, such as, for example, a result column and the respective sequential values thereof may also displayed.

It is seen that a vertical window control is provided as well and that an additional amount of data or execution instances below the current scope of the execution instances/iterations may appear below. The window or table 200' is manipulable by a user in a plurality of ways, for example, a user may enter a filter, a search string, a condition, or the like through the text entry box 226 or any other measures for selectively manipulating the table 200'. For example, a user may input a specific value, such as "0x2bddbbe8." Upon the user entering this filter or search string, only the executions where the data variable has a value of the entered text would be displayed. Similarly, a user may enter "0x1" in the i column 222 which would then restrict the listing of execution instances to only execution instances of selected command 214 with an i variable value of the entered text "0x1." Additionally, if a user was concerned with a particular time of execution or series of times, a user may enter, for example, "490000000" or ">490000000" in the time column 216. Such an entry would thereby limit the listing of execution instances to only those with an execution time as specified by the user.

Text entry box 226 may be used to enter an equation of interest to the user, where the previous instance has disclosed a user entering a static value such as "0x2bddbbe8", the filter entry box is a much more powerful and versatile tool. For example, a user may input a conditional equation such as "greater than i." In this instance, the debugger would evaluate the truth of such a statement where the data value exceeds the value of the i variable and list only instances of execution where the specified condition is met.

Yet another feature includes a selective rendering of variables 228 encountered at the selected line. In this instance, as discussed above, line 38 or command 214 has been selected and as a result, the debugger has determined and displayed to the user in variables windows 228 that the data variable, the i variable, and the result variable, are all related to, or expressly recited in line 38 or selected command 214. Thereby, the user may see a plurality of executions of a specific command and the respectively corresponding system snapshots of a plurality of parameters, values, variables, or system times, amongst other parameters, to better determine errors, inefficiencies, executions of interest, or unexpected states. Additionally, a user is empowered through a plurality of filter, search, or condition constraints to reduce the universe of execution/runtime data to a more desired portion to enable them to debug or reverse engineer a particular program defined by a source code. For example, a user may sort by any of the columns, or may even create one or more "calculate columns" where the user may establish an expression such as, for example, "(i*3)+(data/result)" which will be calculated for each row in the execution table.

As described above, a choose execution features allows the user to see all the different executions of a given line. To provide all of the executions of a selected command line, a database of runtime values or system snapshots (such as seen in FIG. 8) is queried for all the entries whose file name and line matches the ones specified by the user. Such scanning is performed iteratively and measures are taken to prevent a situation where two entries that belong to the same operation are found.

An exemplary pseudo code for finding a listing of all executions of a selected command line is included below:

```
Int id_num=current_entry.id_number;
While (true) {
    candidate=Find next entry whose id number is bigger than id_num and whose file and
        line match the ones required.
    If candidate==null {
    Break;
    } else {
    Add candidate. get_first_entry_of same_operation( ).id_number to the List of results
    Id_num=candidate.get_last_entry_of_same_operation( ).id_number
    }
}
Id_num=current_entry.id_number;
While (true) {
    candidate=Find previous entry whose id number is smaller than id_num and whose file
        and line matched the ones required.
    If candidate==null {
    Break;
    } else {
    Candidate=candidate.get_first_entry_of same_operation( )
    Add candidate.id_number to the List of results
    Id_num=candidate.id_number
    }
}
Return the list of results sorted by the id_number.
```

Figure 3:
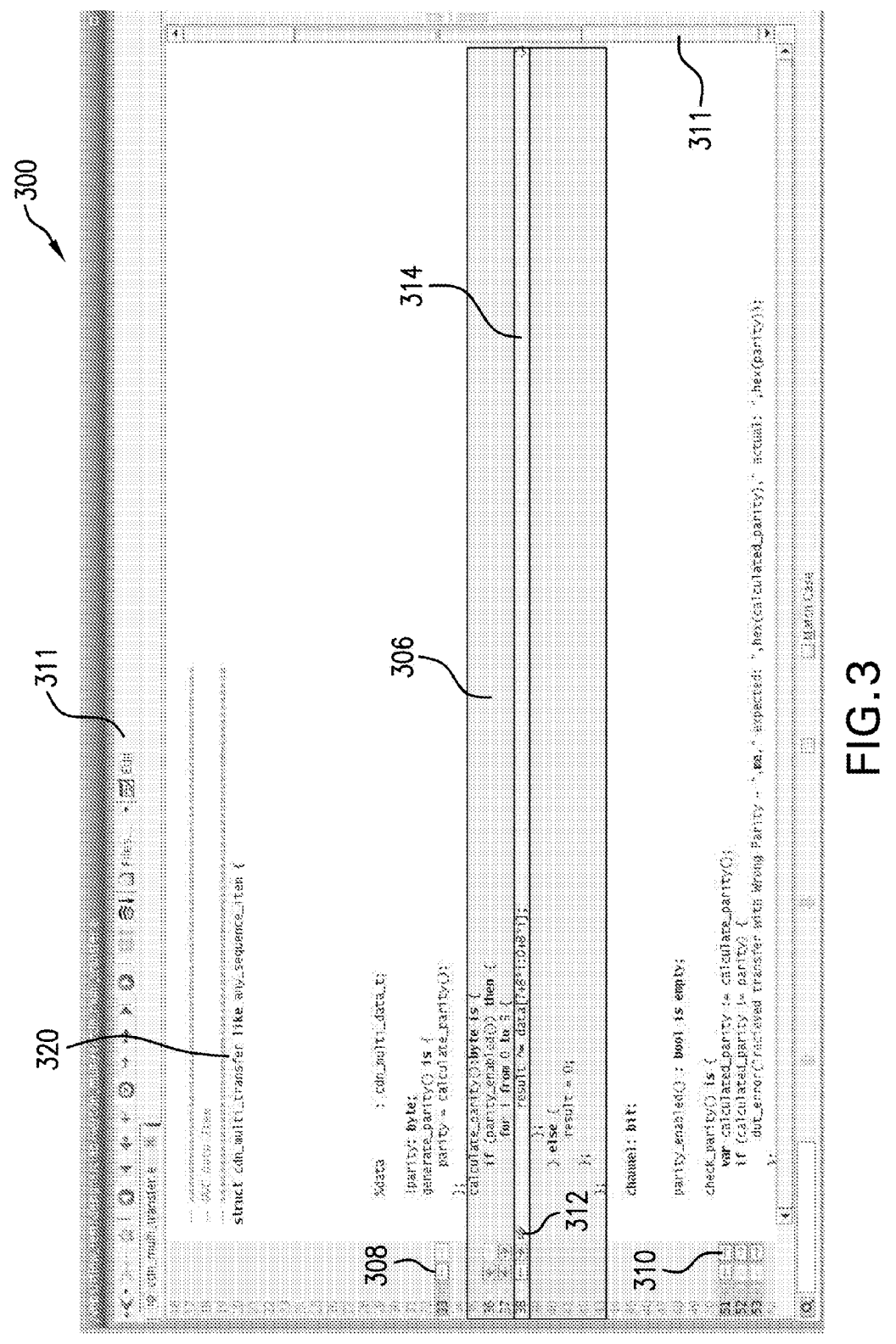

As seen in FIG. 3, an exemplary user interface with a plurality of indicia, user-selectable controls, and a sequence of source code is shown. The user interface herein is merely exemplary but illustrates portions of a user interface of an enhanced debugger in accordance with an exemplary embodiment of the present invention. The user interface 300 includes a plurality of user activate-able controls disposed in a command ribbon 313. The command ribbon 313 may hold a plurality of graphic indicia which are selectable by a user to actuate a tool. Some exemplary tools may include a step forward, step backward, step into, step over, execute, and the like.

A portion of source code defining a computer program is shown in the window. While only a portion is shown, the vertical scrollbar 311 to the right of the window implies that there is another portion of source code which is not currently visible. Within the currently visible portion, a user may select a line of code or a command for manipulation. In this instance, a user has selected line 38 to be a selected line 314. Selected line 314 includes an assignment command assigning a value of a data variable into a result variable. Upon a user selection of a line such as 38 or command such as the "^=" assignment operator, the debugger may, in a preferred embodiment, highlight other lines or commands within the same function or functional block. In this instance, the calculate_parity( ) method has been highlighted with a distinct graphical indicia 306 for the user to quickly and accurately visually discern the instantly selected functional block from the remainder of the source code and other functional blocks.

As a user has selected the command at line 38, the remainder of the visual indicia such as 308 and 310 are re-calculated responsive to the relative execution time of the selected line. In this instance, a user has selected line 38 and therefore it may be seen that line 33 has been executed before line 38 as inferred from the visual indicia 308 which indicates that line 33 has at least one execution that occurred prior to the execution of the command at line 38. Were a user to selectively actuate the visual indicia 308, this selection is taken to the previous execution of the line 33. Contrastingly, the command at line 51 has a visual indicia 310 which indicates that the command at line 310 is executed sequentially in time after the command at line 38. It is seen that the arrow indicia at line "51" has a white background indicating that its execution is out of the current scope.

Additionally, it is seen that a struct (user defined memory object or data storage structure), like a customized variable structure, is defined herein. The "CDM_multi_transfer" struct is defined to include a plurality of data items and functions that act upon those data items. Different instances of struct 320 are seen to be the calling instances in the choose execution window 200 at column 220. Thus, the choose execution window 200 providing variable values, structs and instance names, as well as timing and other system snapshot information, provides usable information to a debugger or programmer, to more readily debug, streamline, or reverse engineer, amongst other tasks, a certain source code.

Figure 4:
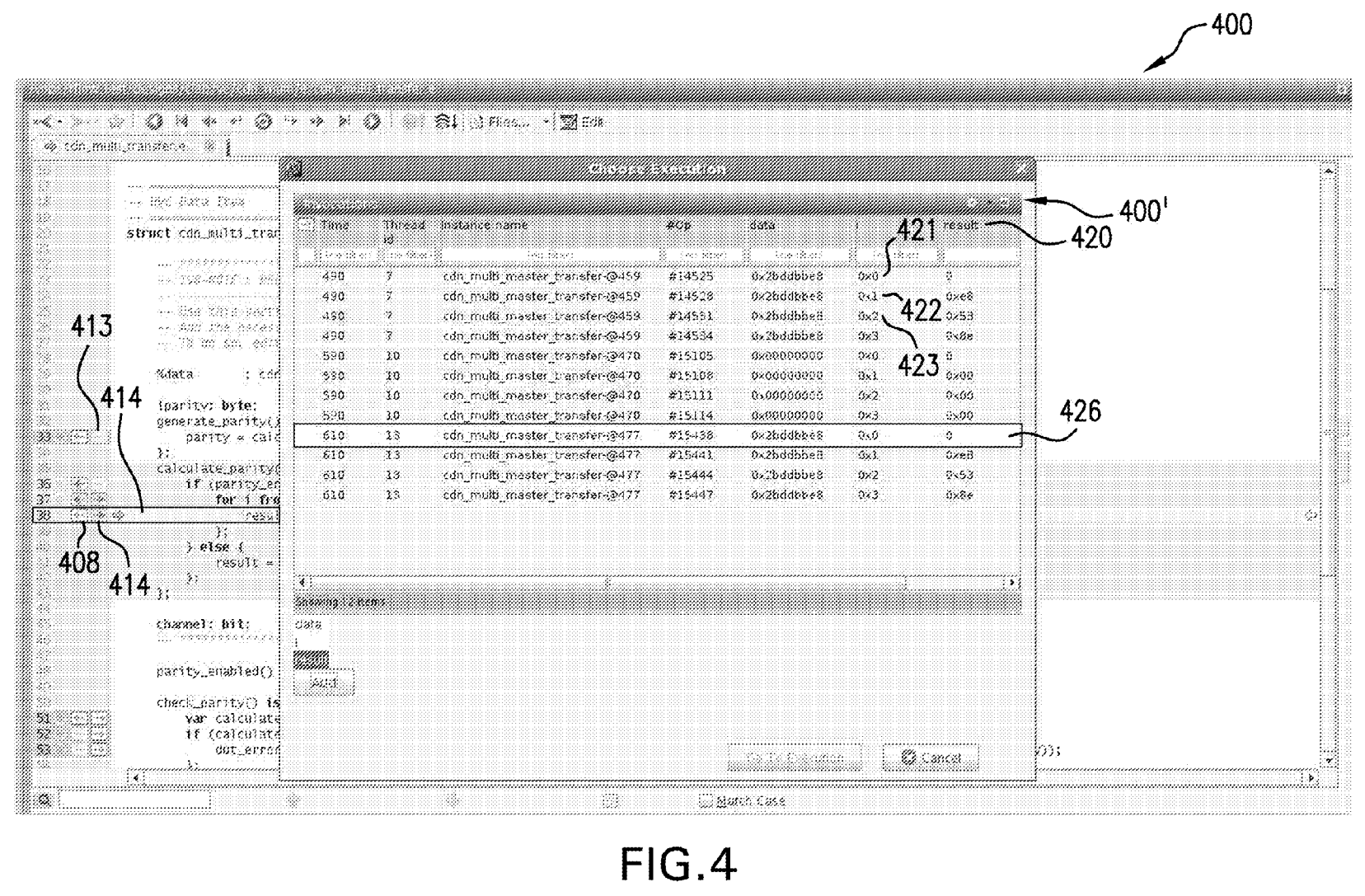

FIG. 4 shows an enhanced navigation debugger 400 (as seen in FIG. 3), however, the choose execution window 400' has been invoked. The invocation of the choose execution window 400' within the enhanced navigation debugger 400 graphical user interface (GUI) has herein been invoked responsive to a user selecting a line or command of code 414. Therefore, it is seen that when a user selects a line or command 414, the choose execution window 400' is invoked responsive thereto. The choose execution window 400' then searches in one exemplary embodiment through a recording of the execution history to find all of the execution instances or iterations of the selected command 414 and displays all (or a portion) of those execution instances with a plurality of respectively corresponding system parameters or snapshots to give the user an idea of exactly what happened (or how the system states progressed including changing memory values, processor registers, system clocks, and the like) throughout the execution of the program defined by the source code.

Within the choose execution window 400', the user is able to selectively choose one (or a plurality) of the execution instances to discern more information about it. In this exemplary instance, the user has selected execution 426 which has certain system characteristics/parameters associated with it, such as the time, the thread ID, the instance or struct name, the operation number, values for the variables or memory locations in the command, such as data, i, and result.

Additionally, the user may manipulate this table, may filter, limit, search, or condition display based upon the values of variables, or other system parameters. Where a user has selected a command 414 and has selected a specific execution 426, the graphical indicia in the debugger may be instantly updated such as to show a previous execution 408, a subsequent execution 410, no subsequent execution 413, and the like. In this instance, it is seen that (responsive to the user selecting a specific execution 426 within the choose execution window 400'), the visual indicia 408, 410, 413, etc., have been updated. Were a user to selectively actuate the visual indicia 410, the execution selection within the choose execution window 400' may iterate to the next execution. Contrastingly were the user to select the previous execution indicia 408, the selected execution 426 may proceed to the previous execution by traversing upwards one slot in the choose execution window 400'.

Figure 10:
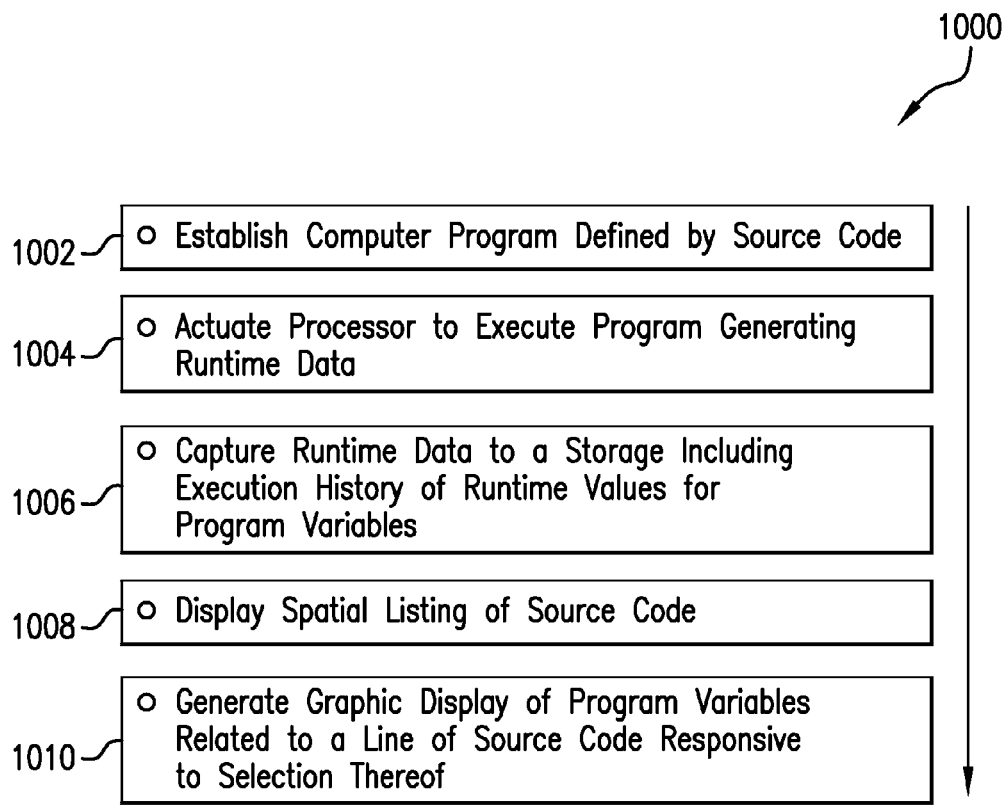
FIG. 10 is an exemplary flow chart illustrating a provision of enhanced navigation features in accordance with an exemplary embodiment of the present invention.

As seen in the exemplary flow diagram of FIG. 10, at block 1002, a computer program is established; the program is defined by source code. At block 1004, a processor is actuated to execute the program which thereby generates runtime data. A plurality of possible preparatory steps intermediate between source code and execution program have been omitted in favor of brevity. Several such exemplary stages may be linking in other referenced source code, parsing source code, compiling runtime executable code, and the like. Runtime data snapshots are then captured at block 1006 to a storage memory to include an execution history of the runtime values for at least the program variables. Indeed, a recording of all (or at least a relevant portion) of the execution steps, commands, and their variables, memory contents, pointer locations, register values, or associated parameters, are captured throughout the runtime of a computer program defined by the source code. Such a recording may be performed for the entire execution of the computer program, or only for an executed portion, such as, for example, the portion prior to a break point arresting execution.

The runtime data is stored in such a way as to be associated with a particular execution time of each command or operation. Such an exemplary runtime data captured may be seen in the chart of FIG. 8. The chart, as seen in FIG. 8, is merely exemplary and the runtime data may be stored in any way as would be known to one of skill in the art to include, for example, a database, a data store, a flat file, or any other measures for storing a plurality of information, data, or parameter values. In the exemplary chart, an ID number (column 802) may include a unique identifier value to thereby identify portions of the runtime from other portions of the runtime and thereby allow each line of the runtime data (or even each of several "actions" or "commands" being used in the same line) to be uniquely identified amongst the others. Another column may indicate the type of "action" 804 which may list, for example: "starting method", "assignment", "method call", "return", "DUT error", and other such commands.

Another column 806 may include a path for the executable, the functional method, a struct, object, or the variables to be evaluated or manipulated. Yet another column, "Value" column 808, includes a specific value of a particular variable, register, pointer, struct, object, or memory location, related to the line or execution of the command thereof. Yet another column includes "Line" 810 which may record a current line number of the source code presently being executed. Once the plurality of system parameters or system states are captured in a snapshot, snapshots, data store, or data structure such as the exemplary database as seen in FIG. 8, a plurality of features are provided. Such provision may be post-mortem (after execution has fully completed) or in vivo (after part of the execution has completed).

When an exemplary method, such as the following, is executed, the database or table seen in FIG. 8 is generated. It is to be noted that the database seen in FIG. 8 is merely illustrative as a database created will likely be much more extensive and include a much more in-depth representation of system states, variables, and the like. For example, the name of the source code file of the executed code, the line number, the method depth (size of the call stack) of every action and the like are generally included.

Foo( ) is {
   var x:int=5;
   var y:int=goo( )+x;
   if (y>10) {
   dut_error("y should not be bigger than 10");
   };
};
goo( ): int is {
   return 6;
};

The entries described above are a finer perspective of the program that was run than the user is generally presented. For example, in the line: "var y:int=goo( )+x;" the user generally sees one operation whereas there are two corresponding entries (707 and 710) as seen in FIG. 8. When a user's current location is on that line—he expects that using "next" would take him to the next line, and not to the second entry of the same line (the one representing the assignment of y). If the user chooses to use "step into" he expects to get to the first line of "goo( )", using "next" from there he expects to be taken to the closing bracket of "goo" and another "next" should lead him to the third line of "foo" (the source code command line with "if (y>10){") and not to the next entry of the table in FIG. 8 which is entry 710 describing again the assignment of y.

It should be noted that there are statements where one "operation" or command line includes several entries or commands, For example: "var i:int=foo(func(1)+func(2), goo( ))+foo(7,8);" is a statement where a user may see one line of code and generally assume that one "operation" exists whereas a step of capturing the runtime data into a database such as seen in FIG. 8, several record entries are made, such as, for example with respect to the above command line: calling "func1", calling "func2", assigning the result of func1( )+func2( ) into the first argument of "foo", calling "goo", assigning its result into the second parameter of "foo( )", calling "foo", calling "foo" another time, and assigning the result of the entire expression into the variable "i").

In order to be able to provide the user with the look and feel he is used to with traditional debuggers, an operation is constructively provided with both a "pre-operation" and "post_operation" mode. Being in pre-operation mode means the current line of code was not yet executed. Being in a post-operation mode means the line was just executed though the scope remains as if the operation has not yet been executed.

Each operation is mapped into 2 entries—the first entry and the last entry of the operation (in many simple operations—they are actually the same entry itself).

Traditional debuggers only allow the user to be in the equivalent of pre-operation mode, therefore generally pre-operation mode is set as a default however, the user is provided with a control to allow selective pre/post execution mode. For instance, any regular stepping (next, step into, back, go to break point, direct access, choose execution and so on) would, by default, lead the user to the pre-operation part of the operation he needed to get to. Two measures are provided for a user to get to the post-operation: 1) by explicitly asking to get there and 2) using the go to cause feature. Such post-operation mode is particularly useful for a "return" command line. During capture of runtime data or snapshots, such return command line is recorded in the database with, preferably the value or values to be returned.

Returning to FIG. 10, at block 1008, a spatial listing of source code is displayed to a user, such as seen in FIGS. 2, 2A, 3, and 4. Next, at block 1010, a graphic display of program variables related to a line of source code responsive to selection thereof are generated and graphically displayed. Such a display consistent with block 1010 may, in an exemplary embodiment, appear as the "Choose Execution" box, window, or terminal screen 400'. Alternatively, such listing of execution instances may be stored and passed as a parameter or data to be manipulated by an automated debugger tool, testing tool, data logging tool, or the like.

Figure 11:
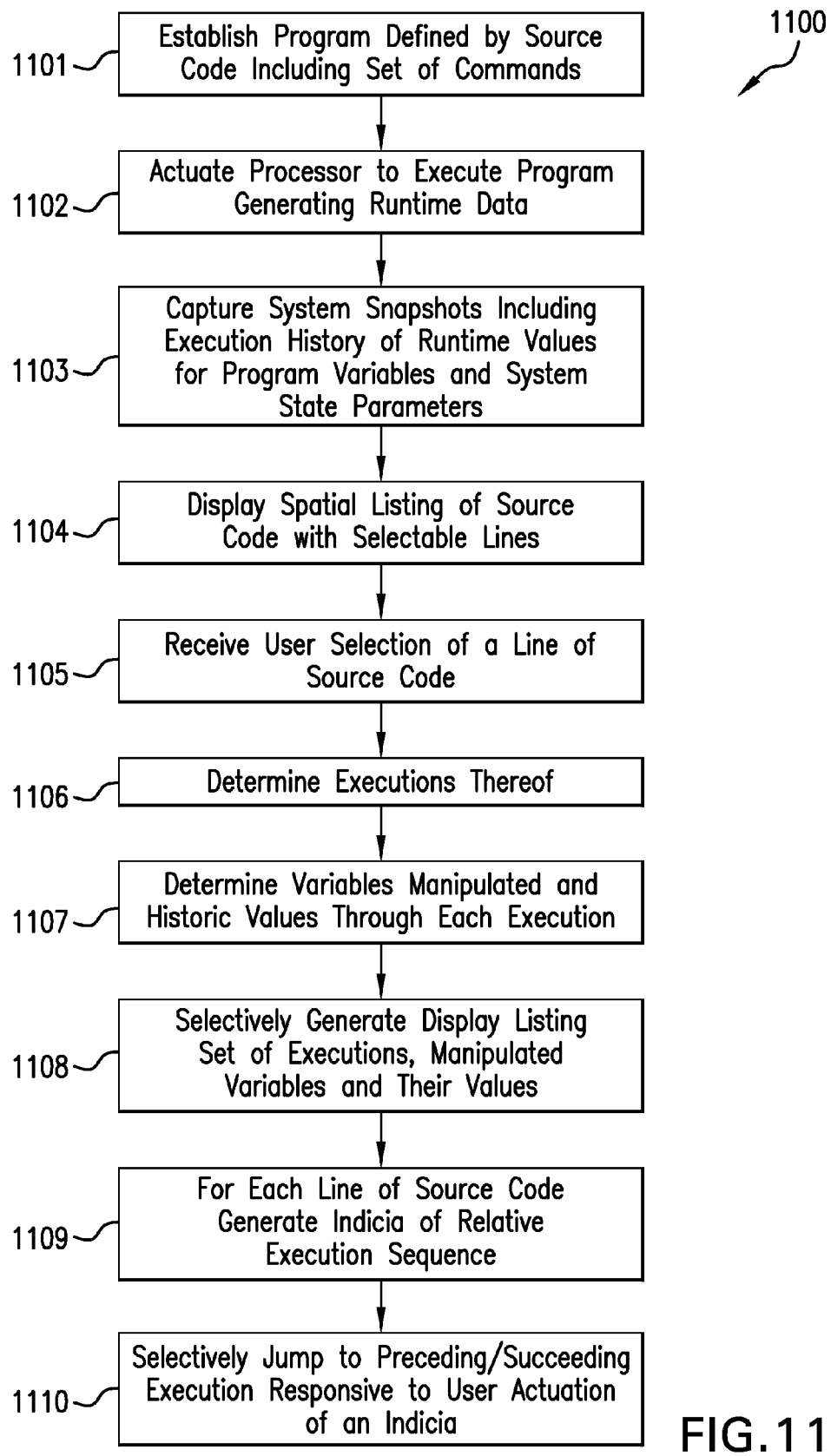
FIG. 11 is a more detailed flow chart illustrating another exemplary embodiment of the present invention.

From another aspect, and as seen in FIG. 11, at block 1101, a program is established to be defined by source code, including a set of commands. At block 1102, in the exemplary flow chart 1100 of FIG. 11, the processor, processors, processor farm, or the like, may be actuated to execute a program or programs which generate runtime data. The runtime data may represent system states, parameters, values stored in memory locations, or the like. It is important to note that while "a" processor has been described throughout, it may indeed be a plurality of processors, a processor with a plurality of cores, a system on chip (SOC), a field-programmable gate array (FPGA), a micro-controller, a plurality of processors on one motherboard, a server farm of a plurality of processors or servers, a cluster, each independently maintained as a separate machine, a blade server, or any other machine or computer as would be known to one of skill in the art.

During the execution of the program, as established at block 1102, a sub-routine or function to capture system snapshots of runtime or system state information is engaged at block 1103. While block 1103 is shown to be subsequent to block 1102, it is important to note that the execution of block 1103 may be concurrent with the execution of block 1102 or may even start before block 1102. Thereby, a plurality of system snapshots which each include execution history of runtime values for program variables and system state parameters are captured. The system snapshots, the parameters, the variable values, execution times, and other data items, may be captured to a database or memory.

A spatial listing of source code with selectable lines is then displayed to a user. Such display may take the form of something as simple as the listed source code of FIG. 1, or may be as complicated as the source code listing in FIG. 3. Each of the lines of source code is selectable by a user. Responsive to a selection of a line of source code, a command therein, or a selectable indicia, a Choose Execution window may be displayed to a user showing the various executions of the command within the line of source code selected by the user.

At block 1105, several other features may be invoked responsive to the debugging program receiving a user selection of a line of source code. Responsive to the selection of a specific execution of a line of source code, the debugger may first graphically highlight the line of source code, may secondly highlight the functional method including the selected line of code, and/or may also selectively calculate each of the other visible lines of source code and their execution times relative to an execution time of the selected code. Further, upon calculation of the relative execution times of the other lines of visible source code relative to the selected line of source code (or an execution thereof), visual indicia such as the icons 208, 209, 210, and 212 may illustratively be provided to the user for time-based navigation amongst executions of the commands of the source code. Using such selectable visual indicia, a user may jump directly to prior or subsequent executions of a particular command. As an example, a user may jump to a previous execution or a succeeding execution of the command found at line 38.

The line of source code and/or command executions thereof are evaluated based upon the system snapshots, the database as illustrated in FIG. 8, or a causality tree as illustrated in FIG. 9, for the specific line number or unique id (UID) of the command execution to determine all (or a relevant portion of) executions of the command within that line of source code throughout the execution of the program defined by the source code. In some situations, execution of the computer program may terminate abnormally, may be arrested responsive to a break point, or other such situation resulting in a partial database or causality tree. Such partial database or causality tree nonetheless provides the user with a clear picture of execution leading up to termination/arrest.

At block 1107, the variables which are either expressly invoked within the command of the line of source code or other variables which may be related to that selected line of source code, potentially including returning function values, registers, memory locations, pointers, structs, objects, and the like, are then determined and their values throughout the execution are determined as well.

At block 1108, a display listing the set of executions of the selected command within the source code line, the variables manipulated, and their values throughout the executions are selectively generated and displayed to a user, passed to a calling program, or logged. Such display may take the exemplary form of the "Choose Execution" 400' and 200 window as respectively illustrated in FIG. 4 and FIG. 2A. Such display of the listing of the executions of the command embedded within the selected line of source code and the variables that have been manipulated throughout the various executions give the user a view of the totality of the changing system state over at least a relevant portion thereof to enable a more intelligent debugging, streamlining, and reverse engineering, amongst other features.

A programmer may be presented with a table output in the Choose Execution window 200 and 400' (such as seen within FIGS. 2A and 4 respectively). The table may comprise a plurality of system variables, memory states, processor clocks, paths, and other such information. The programmer is thereby empowered to form a composite view of the execution of the program to determine problems, opportunities for more efficient operation, and other such features of the computer program to be debugged which might not otherwise be apparent or discernable.

At block 1109, each line of source code is evaluated to determine its execution times relative to the execution of the command within the selected line of source code and the debugger display may be suitably modified to indicate such relations. For example, a command on another line which was executed before the selected command and/or after the selected command may be shown with visual indicia to provide for quick diagnostics, and allow a user to quickly discern a recursive program execution flow throughout the commands and throughout iterations or recursions thereof. Still further, such indicia (aside from allowing a quick diagnostic or determination of the execution path/paths of the program) also allows for execution-instance or time-based traversal of the executions of the various commands embedded within the source code. Thereby, a user (rather than scrolling through potentially millions of lines of source code scattered through thousands of files, libraries, functions, definitions, and the like) may immediately jump to a previous or succeeding execution of a specific command. In other words, a user may quickly and directly jump through each execution of a particular command, evaluating system states, memory states, variable values, and other such relevant information upon each iteration of the execution of the specified command. Thereby, at block 1110, a user is able to selectively jump to a preceding or succeeding execution of a command responsive to the user's actuation of the graphical indicia.

As seen in FIG. 9, a causality tree may be constructed from the captured runtime data/snapshots from the execution of the program defined by the source code. A causality tree 900 may be constructed through the time-wise or sequence-wise analysis of the captured runtime system data. If, for example, an execution of a program stopped at a device under test (DUT) error at node 901, a metaphorical rewind through the captured runtime data or snapshots may reveal a preceding node 902 (representing a check_parity(data) call) which was the immediately preceding command execution prior to the DUT error at node 901. The check_parity(data) error at node 902 may be determined to result from a value of "7" in a Data variable as seen at node 903 and, upon further traversal of the captured runtime data, the causality tree 900 may be successively generated. Alternatively, the causality tree 900 may be constructed contemporaneous with program execution. In node 903, the Data variable is determined to have a value of "7." Traversing causality tree 900, Data value "7" may be determined to result from an earlier assignment of a value of y plus z into the Data variable, such as seen at node 904. Each of the values of y and z variables may have separate causes. For example, the z value may originate from a node 908 where the variable z was determined to have a value of "5."

Further traversing the causality tree 900, it is seen that node 909 is a cause for the value of z being "5" due to an assignment therein where the variable z was assigned a value of a+b−c. Following the causality tree 900 further, it is seen that the a value equaled "6" at node 910, the b value had a value of "1" at node 911, and a c variable had a value of "2" at node 912, and therefore, at node 909, the "6+1−2"=a value of "5" for the variable z at node 908 which contributed in concert with the variable y value to the assignment of data being "7" at the 903 node. Stepping back for the other cooperating data value being "7" at node 904, leads to a variable setting function at node 905 for the variable y in a setY(m) function wherein m is determined to have been assigned the value "2" at node 907 and the setY function at node 906 is seen to merely return the m value. It is seen that at block 905, y's value is "2", z's value at block 908 is "5", and therefore, at node 904, the data value is assigned the value of "2+5" which equals "7" as seen in the resultant node 903, which then triggers a device under test error due to a check_parity at node 902 which ultimately results in the DUT error of node 901. The instant causality tree 900 is constructed automatically from the captured runtime data, and is selectively displayed to a user showing the instant node (901) and the ultimate root cause being nodes 906, 907, 910, 911, and 912. The root cause nodes 906, 907, 910, 912 are displayed with a path from the error node 901 traced back through the causality tree 900 to each of the root causes. Such display of the failure, root causes, and a path relating the root causes to the current error node allows the user to determine what caused the error and how to go about correcting it. Such a causality tree may be constructed for any given execution of a code line in the program and not merely the dut_error. Such causality trees may be constructed (or at least a first level of children nodes thereof) for any current operation.

Figure 12:
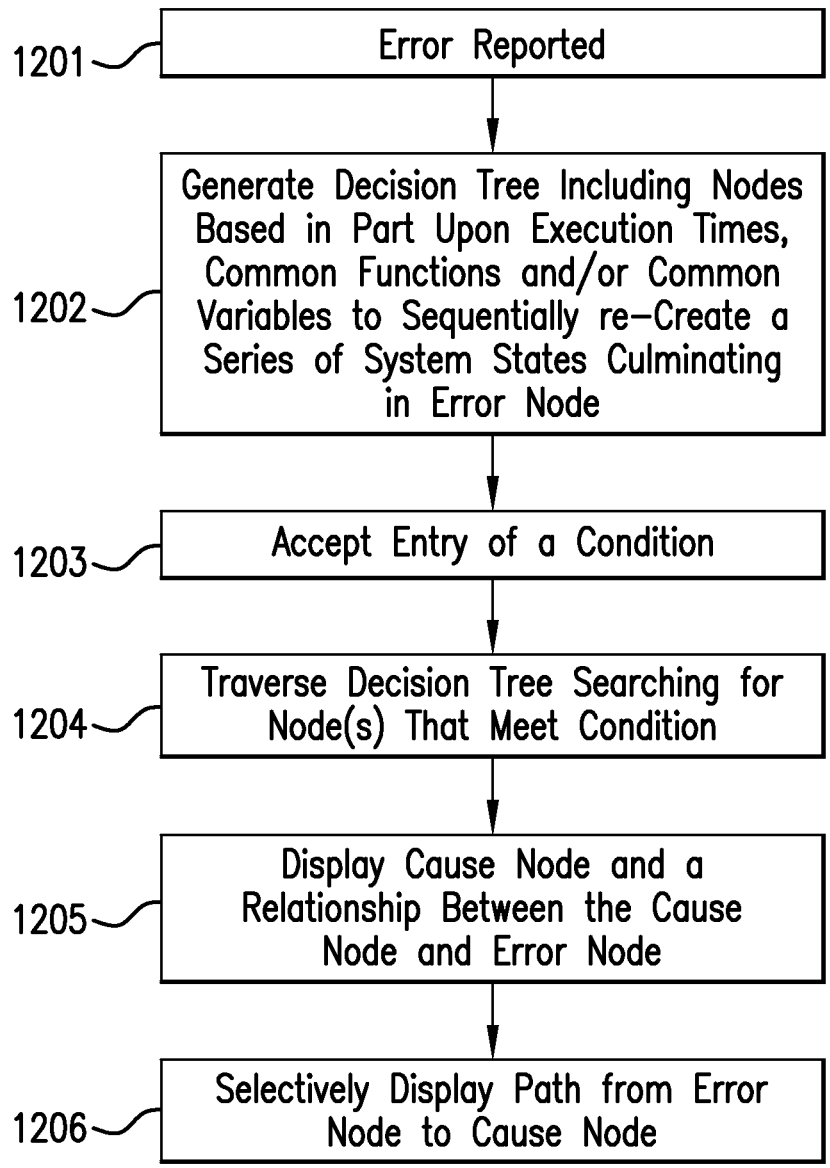
FIG. 12 is another flow diagram illustrating another exemplary embodiment of the present invention.

As seen in FIG. 12, an error is reported at block 1201. At block 1202, a causality tree including nodes based in part upon the execution times, common functions, and/or common variables, is constructed to sequentially recreate a series of system states culminating in an error node or a currently selected execution. Such causality tree may, in an exemplary form, be similar to the causality tree 900 seen in FIG. 9. However, as programs being debugged may have source code numbering in the millions of lines, it is important to keep in mind that causality tree 900 is a rather simplified example relative to an actual causality tree constructed from captured runtime data of the execution of a program based upon source code having potentially millions of lines. In a preferred configuration, the causality trees are not fully constructed in advance, but instead, a first level of children nodes are created, and then, after a go to cause launch is detected, the causality tree is then elaborated. To save processor time, each successive layer of nodes may be constructed as they are being explored by a user or the go to cause feature.

At block 1203, a programmer is provided with measures to enter a condition to be searched. The causality tree 900 will be traversed to find a node within the path from the resultant node—such as, for example, node 901, and the cause nodes 906, 907, 910, 911, and/or 912 where the condition is satisfied. For example, a user may enter a condition, such as "data=7," or "data<Y." The conditions that a user may enter are practically unlimited. The user may create any such condition calling upon any of the variables, nodes, functions, or various system states, such as time, programming language, or the like, to craft the condition.

In another such example, a user may enter a condition for example, a specific programming language such as: HDL, C#, C++, C, visual basic, E language; an equation; a constraint; and the like. The causality tree 900 is then traversed in a search looking for the first node along the path from the resultant node 901 to a root cause such as node 912 where the node satisfies the condition specified by the user. At block 1205, a root cause node and a relationship between the root cause node and the error or resultant node is then displayed. At block 1206, the path from the error or resultant node 901 to the root cause node is selectively displayed to the user. The causality tree 900 may be traversed breadth first, depth first, by execution time, or the like.

As seen in the exemplary source code debugging window of FIG. 5, a device under test error 530 has been flagged. The user has selected line 52 which contains an "IF" command which evaluates the calculated_parity relative to the parity value of a variable in memory. It is seen that if the "IF command" of line 52 is evaluated to be true or "1", then the command of line 53 is executed which is a system call to a DUT_error system call. Such DUT_error may be thought of as a breakpoint, or an error node, as discussed in connection with the causality tree 900 above. When the DUT_error system call is called, execution of the program may be arrested or in a post-execution environment, a user may be presented with an error cause determination window 600. The error window 600 may outline a cause or resultant node 640 basically stating that there was an error and potentially what type of error. A causality tree may then be selectively generated in the error window 600 relating a plurality of nodes between the resultant error node 640 and a potential cause node, for example, node 652. Viewing the error window 600 of FIG. 6 in concert with the portion of source code of FIG. 5, one may see that the DUT_error of line 53 was reached due to a "true" evaluation at line 52 comparing "calculated_parity" to "parity." Such two main root causes 641 and 644 are seen as the two leftmost hierarchical nodes of the causality tree. At node 641, an "IF" line was reached at line 52 as seen in FIG. 5, and concurrently, at node 644, the value of the IF command was calculated to be "true." Tracing back in time from a cause 641 shows that the IF command was reached due to a method call of check_parity at node 642. The node 642 is reached due to a while condition at node 643 and the node 643 was reached due to another method call precedent to the while call of node 643.

The other condition leading to the resultant DUT error at node 640 may be the evaluation of a condition at node 644 which flowed from the value of the calculated_parity being "0xa5" at node 645 which was a result of the calculate_parity function call resulting in "0xa5" at node 646 which was itself a result of the execution of node 647 which was in turn a result of node 648 which was in turn the result of an execution of node 649 and 650.

As another example, a programmer may know that a device under test (DUT) error may have resulted from changes that the programmer made to the hardware code of the device under test. The programmer may know that the device under test is programmed in a language such as hardware descriptive language (HDL) as opposed to e code which is used generally to program tests which are performed on the device under test. Knowing that the programmer, for example, made changes to the device under test in the hardware descriptive language, may allow the programmer to say "find the root cause node in HDL code." As the programmer may know in this example that nothing is changed in the e code but significant changes may have been made last night, for example, in HDL code. Upon reaching the DUT_error, the programmer is able to specify conditions such as HDL language and the causality tree 900 may be traversed automatically to determine the first node or nodes which are in the HDL language. Such code may be identified to the user as meeting his or her conditional statement and being along the path of resultant error node and root cause nodes to thereby allow the user to determine likely points where the HDL code may have been erroneously modified, allowing the user to thereby remediate such problem without traversing potentially millions of lines of code in potentially several different programming languages.

Each line of source code may have parameters, tags, or metadata associated with it that may not be visible in a debug viewing of the source code, such as exemplary FIG. 5. Such tags or metadata may be incorporated in a line, an external file, or may be in portions of source code files such as a file header or footer. Additionally, separate files of source code or portions in a database of source code or source code version control repository may be designated as being of different language or having specific parameters associated therewith. Flowing from that, the causality tree 900 as seen in FIG. 9 and as selectively displayed in error window 600 of FIG. 6, may have metadata and parameters associated with each node along the causality tree 900. For example, an indicia such as element 651 or 652 may display a certain characteristic, parameter, association, or the like relating to a specific node along the causality tree 900. For example, indicia 652 may indicate that the node, command, or line is of the HDL language. The indicia 651 may indicate a communication between an e code language test management suite and an HDL defined device under test. Thereby when the user enters the exemplary condition: "code=HDL", the causality tree is traversed until the node 652 indicated to be an HDL is located and that node 652 may be presented to the user. Preferably, the root cause node meeting the condition node 652 would be presented to the user along with a display of a path or relationship between the cause condition meeting node 652 and the resultant error node 640. Such a display of the relation between node 652 and node 640 is illustrated in the error window 600 of FIG. 6. Thereby, a user is able to quickly determine the error and a plurality of causes which caused the error. In another configuration, the results are displayed in a straight line of cause and effect—which may selectively present the nodes in the root between the error and the found node.

Each of the nodes such as 640, 641, 643, and the like, having a minus sign to the left of the node may indicate that it is a hierarchically superior node having a plurality of child nodes. In conventional debuggers, while a reached DUT-error node 640 may be presented to the user with a plus sign, the instant invention provides for the selective expansion of the child-containing-parent node along the path to the conditional root cause node 652. Thereby it is seen that rather than clicking on a vast number of plus signs to expand each of the sequential parent nodes to manually search for a condition or a root cause node, such as 652, the path of the expansions has already been selectively and intelligently expanded for the user displaying the cause. As another example, the node 649 has not been expanded because its child nodes are not relevant to the path between the cause and the result node 640. Contrarily, were each node promiscuously expanded, the list of causes could reach tremendous lengths and provide no useful or relevant feedback to a programmer looking to debug an error and a cause thereof.

A measure for providing enhanced go to cause navigation may include a portion implemented by an exemplary pseudo-code, such as:

```
Entry Break_on_go_to_cause(Entry ent) {
    Queue q = new Queue;
    q.enqueue(ent)
    while q is not empty and not should_stop( ) {
        current = q.dequeue( );
        if current.meets_stopping_conditions( ) {
            return current;
        } else {
            Causes = current.get_c auses( );
            q.enqueue(causes);
        }
    }
}
```

It is seen in the pseudo-code above that Should_stop( ) may be implemented according to the developer, debugger, or user needs—it may stop after a certain time has passed, a certain depth is reached, a certain number of nodes are expanded and so on to thereby ensure (especially for programs with an extremely large number of executions) that the go to cause finder does not enter an almost perpetual loop.

The function "Meets_stopping_conditions( )" may be implemented according to the break point or condition the user inputs to use. For example if the user wants to break when reaching HDL language—the function checks if the entry is of an HDL source. If the user wants to break on a certain method, or a changed lines of code—the function checks whether the entry is of that method or line of code. If the user wants to "break on value" the function would check if the entry's value is the same as the one specified by the user.

It is important to note that the pseudo-code above is a very simplified illustrative example. Duplicate checking to ensure that the same cause is not enqueued twice is preferably employed as well. The pseudo-code above illustratively provides an entry, node, or root cause with the shortest causality chain or execution path from the starting entry or resultant node (the node which resulted from an error, for example). In another embodiment, a user may specify that the closest cause in time may be preferable. In such a mode, queue "q" above may be replaced with a priority queue which may be prioritized by time (and/or sequence number) or by id number.

Inasmuch as the function is iterative, and the first cause node found may not be the one the debugging user is looking for, a user may again select a go to cause indicia which may repeat the search from the current cause node proposed without restarting from the resultant error node. The pseudo code would then return the queue q with the found entry. The queue q may then be used to continue running the search from the presently found node. The execution path or causality chain may be marked, tagged, or separately written to preserve and display to the user to assist in the debugging effort.

Figure 7:
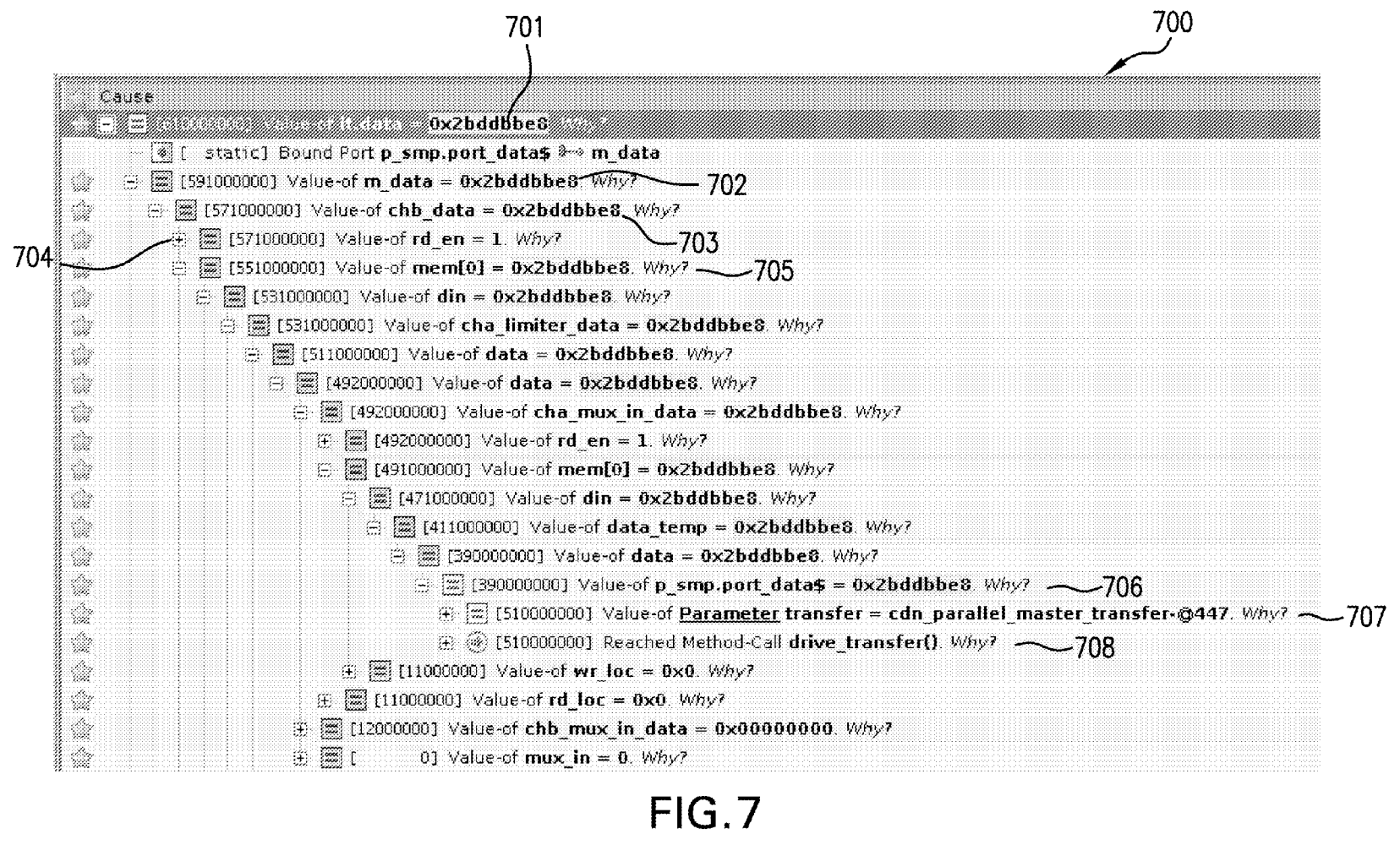

Another aspect used either in concert or separately is a "follow the value" function as seen in FIG. 7. To aid in the debugging process, a user may find it beneficial to understand where a certain value came from—that value may be related to an error, or may just be a value which is unexpected, or of interest. If, for example, an error is present, and it is seen that a calculate_parity function has failed due to a lack of identity between a calculated parity and a pre-calculated parity, a debugger may have used the previous cause-finding measures (discussed above) to determine a line number as a root cause node along the causality tree to the resultant error node. Having traced through the causality tree to the root cause of the error, the user may see a lack of identity between the calculated parity and a pre-calculated parity. Seeing that, for example, the calculated parity is "5", while, a pre-calculated parity is "2", and a lack of identity is lacking between the two. A user is able to say: "where did this calculated parity 5, (or other such distinct non-identical number) come from?" FIG. 7 shows a cause window or a follow the value window 700. A distinct number such as "5" or "0x2bddbbe8" as seen at block 701 may be searched for throughout the captured runtime and/or the causality tree path arriving at a specific error or result. The unique value 701 may be searched throughout the path of the causality tree of nodes arriving at the result node. Thereby, a display 700 may be selectively generated to show each of the nodes along the causality tree from a result back to a root cause node, showing each node along that path, where the unique value 701 was created/generated/calculated. It may be seen that the unique value 701 is present in a plurality of sub-cause nodes such as 702, 703, 705, 706, and the like. The user interface in display window 700 selectively shows each of the nodes having the unique value 701, but also selectively hides branches such as 704 which nowhere make mention of the unique value 701. Thereby, a user is able to trace the origin of the unique value 701 back to a source node 706.

The first node that references the unique value 701, such as node 706, all of whose child nodes 707 and 708, do not reference the unique value 701, is determined to be the root cause 706 of the unique value 701. Therefore, a user is given a display 700 with the result 701 and an intelligently and selectively generated path or relationship between the result node 701 and the cause node 706. A user is thereby able to quickly find the origin of a given value, instead of manually traversing the tree to find it. It should be noted that transferring a value through method parameters and by assigning it from one variable or field to another is very common—since every such action leads to another node in the tree in the way to the origin node which may possibly lead to a very long and tedious search if done manually. In Hardware Descriptive Languages (HDL) languages such as VERILOG and VHDL, a value is very commonly passed along wires or registers— again every such "pass" adds a node on the way to the origin node making the search in such languages even more difficult. Such measures as described above may prove very helpful for a user in debugging, streamlining, and/or reverse engineering a particular program, device, or source code.

A simplified exemplary pseudo code for a configuration of such a follow the value function is shown below:

```
Entry follow_the_value(Entry ent, String value) {
    Causes = ent.get_value_causes( );
    found = false
    For each (cause_ent) in causes {
        If cause_ent.value == value {
            Found = true
            Return follow_the_value(cause_ent, value)
        }
    }
    If not Found {
        Return ent
    }
}
```

While getting the causes, care is preferably taken to distinguish between "flow causes" and "value causes"—preferably returning only the value causes. In the following exemplary command "a=is_big? big_size:small_size;" where a will be assigned either the value of big_size or small_size depending upon the evaluation of a relative to is_big. is_big=true is seen to be a flow cause—it determines which 'branch' would be used next. Big_size=59,677 is a value cause because it determines the value a is going to get.

In certain situations, more than one result node may be returned. For example "my_bits=bits_1||bits_2" with bits_1 being equal to bits_2. In such a situation, my_bits value being x is a result of both bits_1 and bits_2 being x. The user might expect to see the origin points of bits_1 and of bits_2. This may be handled by changing the recursion above to return a list of entries and changing the first return statement to add results to a list and return them only once the loop is complete.

Figure 13:
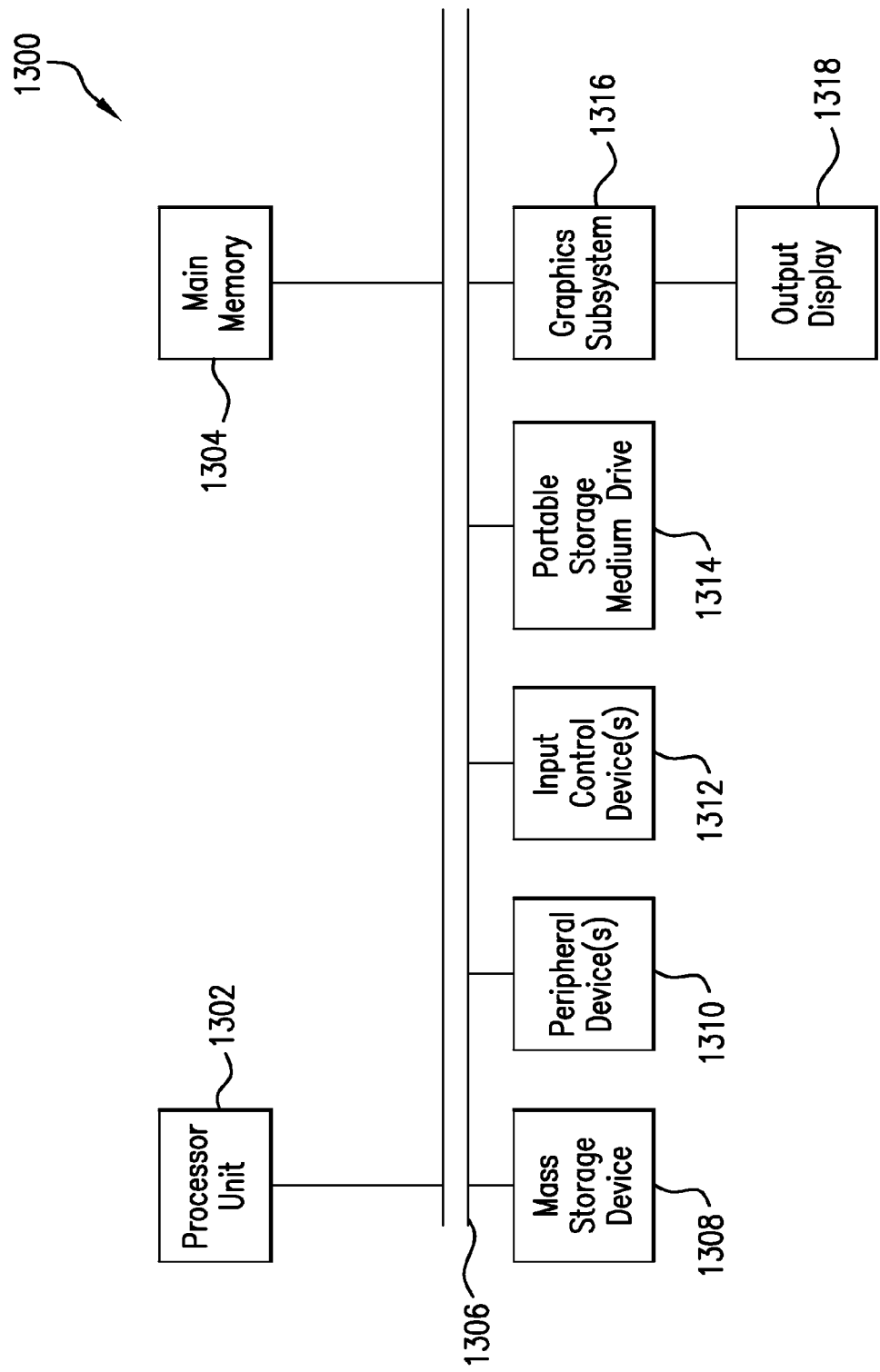
FIG. 13 is a block diagram illustrating an exemplary interconnection of components in a processor-based system for implementing an exemplary embodiment of the present invention.

FIG. 13 illustrates a block diagram of a computer system for executing a debugging environment in accordance with various embodiments of the present invention. A computer system 1300 contains a processor unit 1302, a main or primary memory 1304, an interconnect bus 1306, a mass storage device 1308, peripheral device(s) 1310, input control device(s) 1312, portable storage drive(s) 1314, a graphics subsystem 1316, and an output display 1318. Processor unit 1302 may include a single microprocessor or a plurality of microprocessors for configuring computer system 1300 as a multi-processor system. Main memory 1304 stores, in part, instructions and data to be executed by processor 1302. Main memory 1304 preferably includes banks of dynamic random access memory (DRAM) as well as high-speed cache memory at various levels of the system architecture.

For the purpose of simplicity, the components of computer system 1300 are connected via interconnect bus 1306. However, computer system 1300 may be connected through one or more data transport means. For example, processor unit 1302 and main memory 1304 may be connected via a local microprocessor bus and mass storage device 1308, peripheral device(s) 1310, portable storage medium drive(s) 1314, and graphic subsystem 1316 may be connected via one or more input/output (I/O) busses. Mass storage device 1308, which may be implemented with a magnetic disk drive, an optical disk drive, a solid state device, an attachment to network storage, and the like, is preferably a non-volatile storage device for storing data, databases, and instructions, to be used by processor unit 1302. In a software embodiment, mass storage device 1308 may store the software to load it into main memory 1304 or into a firmware of DMA controller 1320 or a motherboard housing the DMA controller 1320.

Portable storage medium drive 1314 operates in conjunction with a portable non-volatile storage medium such as a floppy disk, a compact disk read only memory (CD-ROM), or a digital versatile disk read only memory (DVD-ROM), to input and output data and code to and from the computer system 1300. In one embodiment, the software is stored on such a portable medium, and is input to computer system 1300 via portable storage medium drive 1314. Peripheral device(s) 1310 may include any type of computer support device such as an input/output (I/O) interface, to add additional functionality to computer system 1300. For example, peripheral device(s) 1310 may include a network interface card to interface computer system 1300 to a network.

Input control device(s) 1312 provide a portion of the user interface for a computer system 1300 user. Input control device(s) 1312 may include an alphanumeric keypad for inputting alphanumeric and other key information; and a cursor control device such as a mouse, a track pad or stylus; or cursor direction keys.

In order to display textual and graphical information, computer system 1300 contains graphic subsystem 1314 and output display(s) 1318. Output display 1318 may include a cathode ray tube (CRT) display, liquid crystal display (LCD), plasma display, projector, or the like. Graphic subsystem 1316 receives textual and graphical information and processes the information for output to display 1318.

Figure 14:
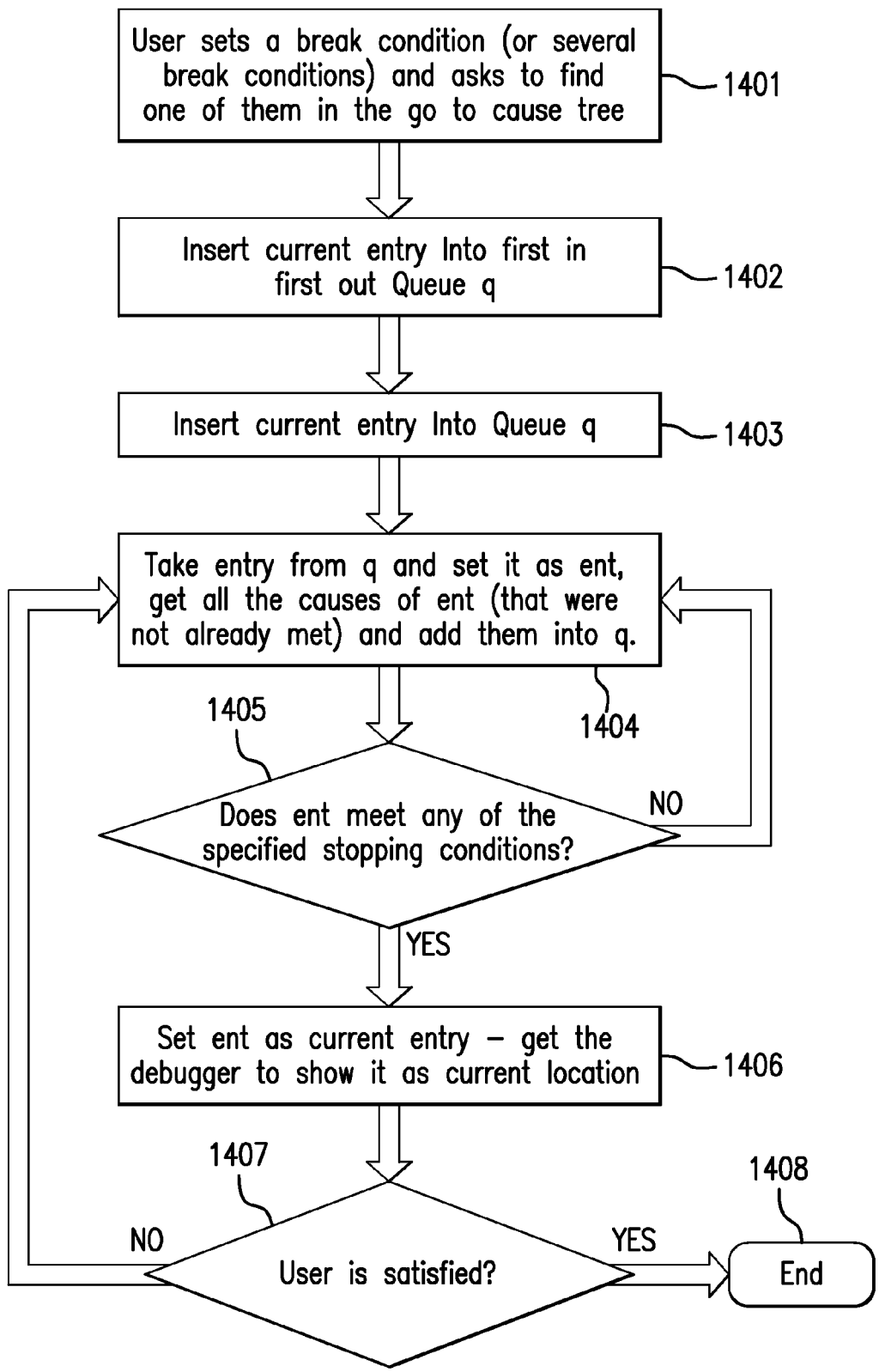
FIG. 14 is a flow diagram illustrating an exemplary embodiment of the present invention.

As seen in FIG. 14, a go to cause flow is illustrated. At block 1401 a user sets at least one break condition and executes a search for at least one of the break conditions in a causality tree or go to cause tree. At block 1402, a current entry command, action, or line of source code is inserted into a queue q. The queue is preferably a first in first out (FIFO) queue though any suitable queue may be employed. At Block 1403 the next current entry is inserted into the queue q. At block 1404 the first entry is taken from queue q and set as an entry ent. All of the causes of the entry ent are added into the queue q. Gathering the causes may be performed as discussed above and is accordingly not reproduced here for brevity and clarity purposes. At block 1405 it is determined whether the entry ent meets any of the specified stopping conditions. If no, then entries are successively taken from queue q at block 1404 until the decision block 1405 is satisfied. Once block 1405 is satisfied and an entry has been found which satisfies a specified condition, the flow proceeds to block 1406. At block 1406, the entry ent which satisfied the stopping condition is set as the current entry. The debugger display is actuated to display the current entry to the user. The user may then stop continued processing, having found the errant command, or may fetch another entry ent from the queue q at block 1404 and may re-iterate through the loop of blocks 1404, 1405, 1406, and 1407 until the user finds an entry command, action, or line of source code which the user was looking for to debug and flow proceeds to end block 1408.

Figure 15:
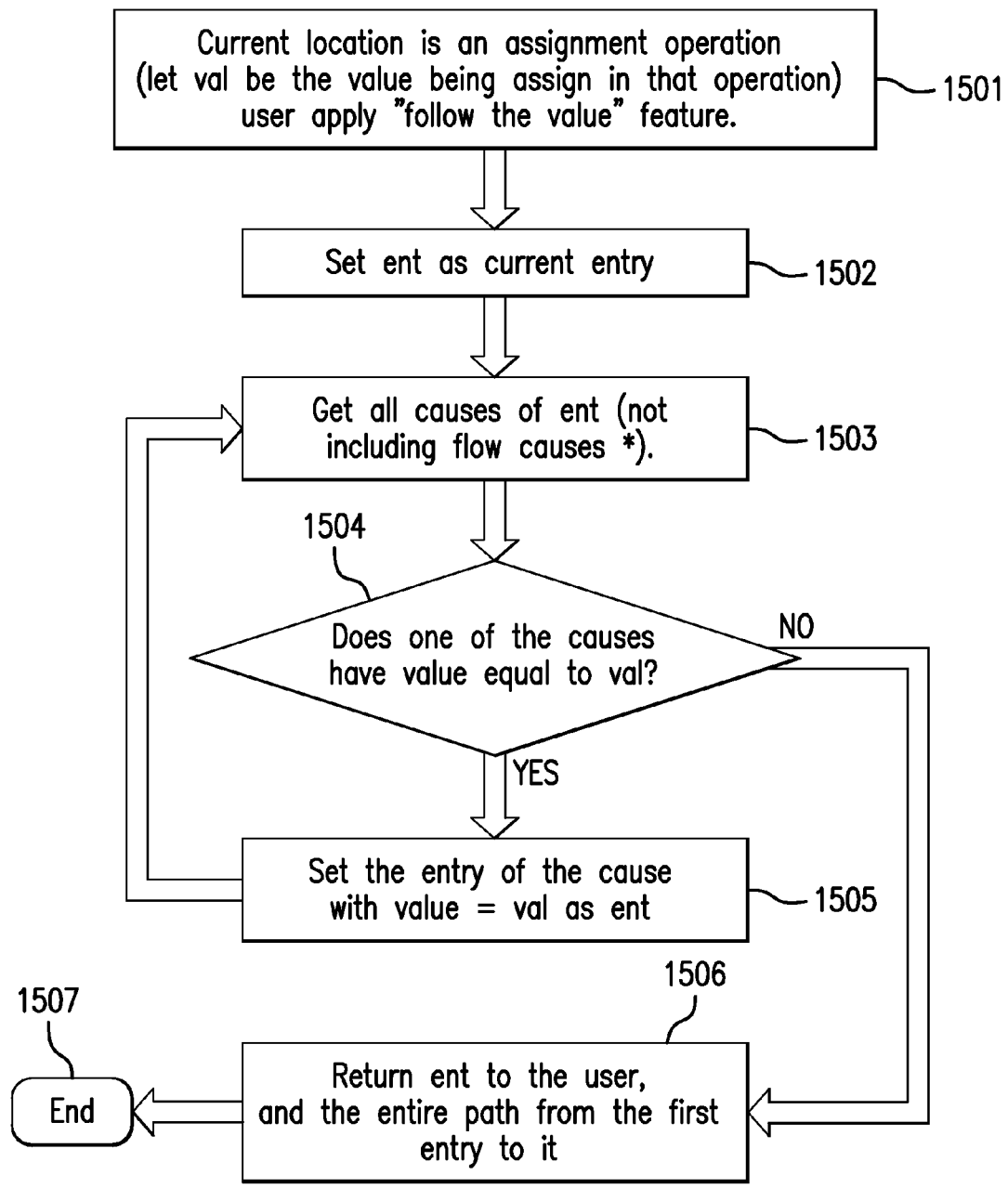
FIG. 15 is a flow diagram illustrating an exemplary embodiment of the present invention.

As seen in FIG. 15, a follow the value flow is illustrated. At block 1501, a current location in a source code of command lines is an assignment operation such as, for example, x=a+b. The user actuates a follow the value feature. Flow progresses to block 1502 where an entry ent is set as the current entry. At block 1503 all the causes of the entry ent are gathered. Gathering the causes may be performed as discussed above and is accordingly not reproduced here for brevity and clarity purposes. Preferably the flow causes discussed above are not included. At block 1504 the causes are evaluated to determine if a value of one or more of them is equal to a value in the location that was the current location when the follow the value feature was actuated at block 1501. If a value in one of the causes does equal the originally sought value, then at block 1505, the entry of the cause with the value is set as entry ent and flow progresses to block 1503 to find all causes of the newly established entry ent. This loop of 1503, 1504, and 1505 is repeated until none of the causes have the value sought. Having found the parent node with no children node having the value, this parent may be considered an original cause of the value sough and flow may progress to block 1506 where the parent node found is returned to the user along with a path between the current location (line of code or command) of block 1501 and the command or line of code found to be the origin of the value. At block 1507, the flow ends.

Figure 16:
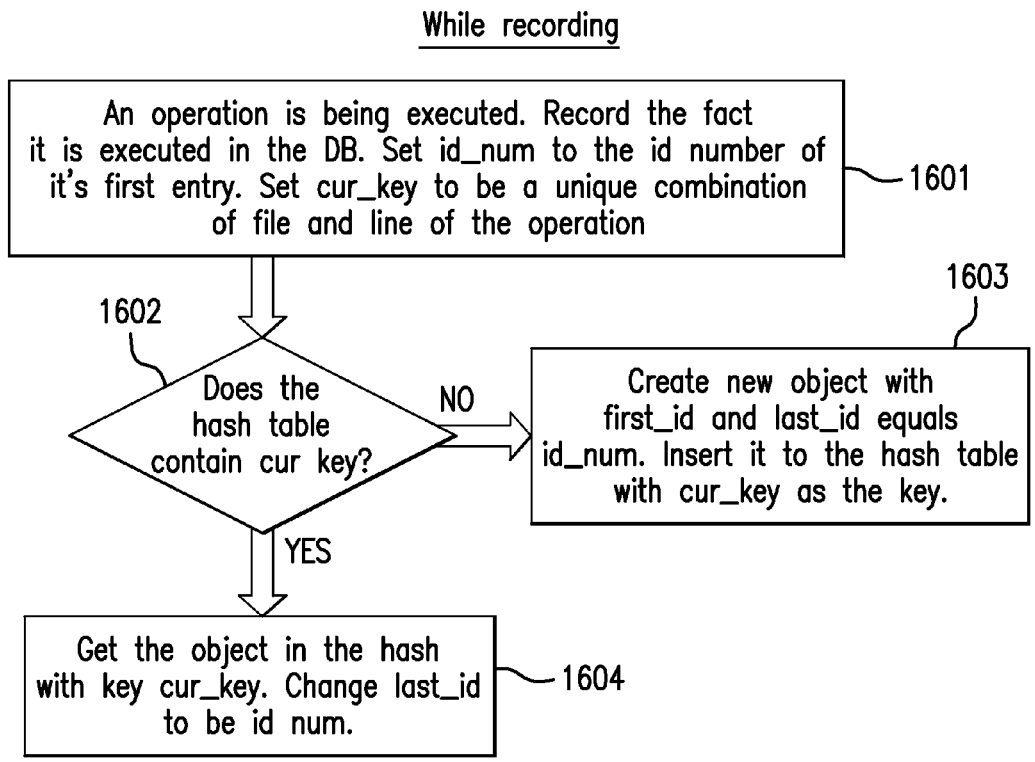
FIG. 16 is a flow diagram illustrating an exemplary embodiment of the present invention.

As seen in FIG. 16, a flow is shown for recording an execution history of an executing program defined by source code having a plurality of lines of commands. At block 1601 an operation is executed. An identifier for the operation, command, line of source code, or action, is recorded. Such identifier is preferably a unique identifier (UID) to allow accurate tracing and retrieval thereof in the execution history. Such is recorded, preferably along with a time and variables or runtime values associated with the operation into a database. Any suitable database may be employed such as, for example, a DB2, relational database, or the like. The UID is set as id_num for the first entry. A variable, flag, or pointer cur_key is set to be a unique combination of file and line of the operation. At block 1602 a hash table is evaluated to determine if cur_key exists. If not, flow progresses to block 1603 where a new object is created with first_id and last_id set to id_num. The new object is inserted into the hash table with cur_key as the key and flow proceeds back to block 1601. Contrastingly, if the hash table does contain the cur_key, then flow proceeds to block 1604. At block 1604, seeing that the currently executing operation has been executed before, the object with cur_key matching the instantly executing command or operation is recovered from the hash table and updated such that last_id is updated to be id_num. Additionally, values of program variables for each cur_key may be recorded in an object, database, or the like. Any storage measures suitable for storing a plurality of values cross-referenced to cur_key, id_num, or a UID may be employed.

Figure 17:
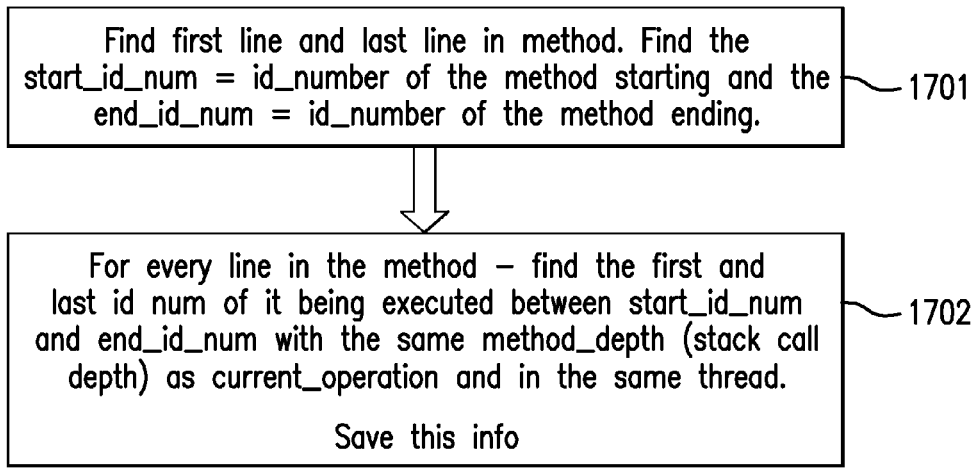
FIG. 17 is a flow diagram illustrating an exemplary embodiment of the present invention.

As seen in FIG. 17, a flow for determining other command lines of a source code that belong to a certain method or functional block is shown. At block 1701 a first line and a last line in the method or functional block are found. The start_id_num=id_number of the method starting and the end_id_num=id_number of the method ending may be employed where they are provided by a debugger. Alternatively, the spatial arrangement of source code may be parsed, metadata may be evaluated, or any other such suitable measures may be employed for determining the bounds of a method or functional block. In one simplified example, a currently selected line of source code may be evaluated. Starting from the currently selected line, flow may proceed upwards spatially to a predefined header of a method which may be marked as the start_id_num. Flow may thereafter proceed spatially down until a predefined end signifier such as "};" or any other suitable signifier has been determined. Such line may then be assigned end_id_num. Thereafter, all lines falling between start_id_num and end_id_num may be highlighted to signify common membership, such as a highlighting in the color blue. However, it bears noting that any color or indicia suitable to signify common functional membership to a user may be employed. Both the start_id_num and end_id_num are saved.

Figure 18:
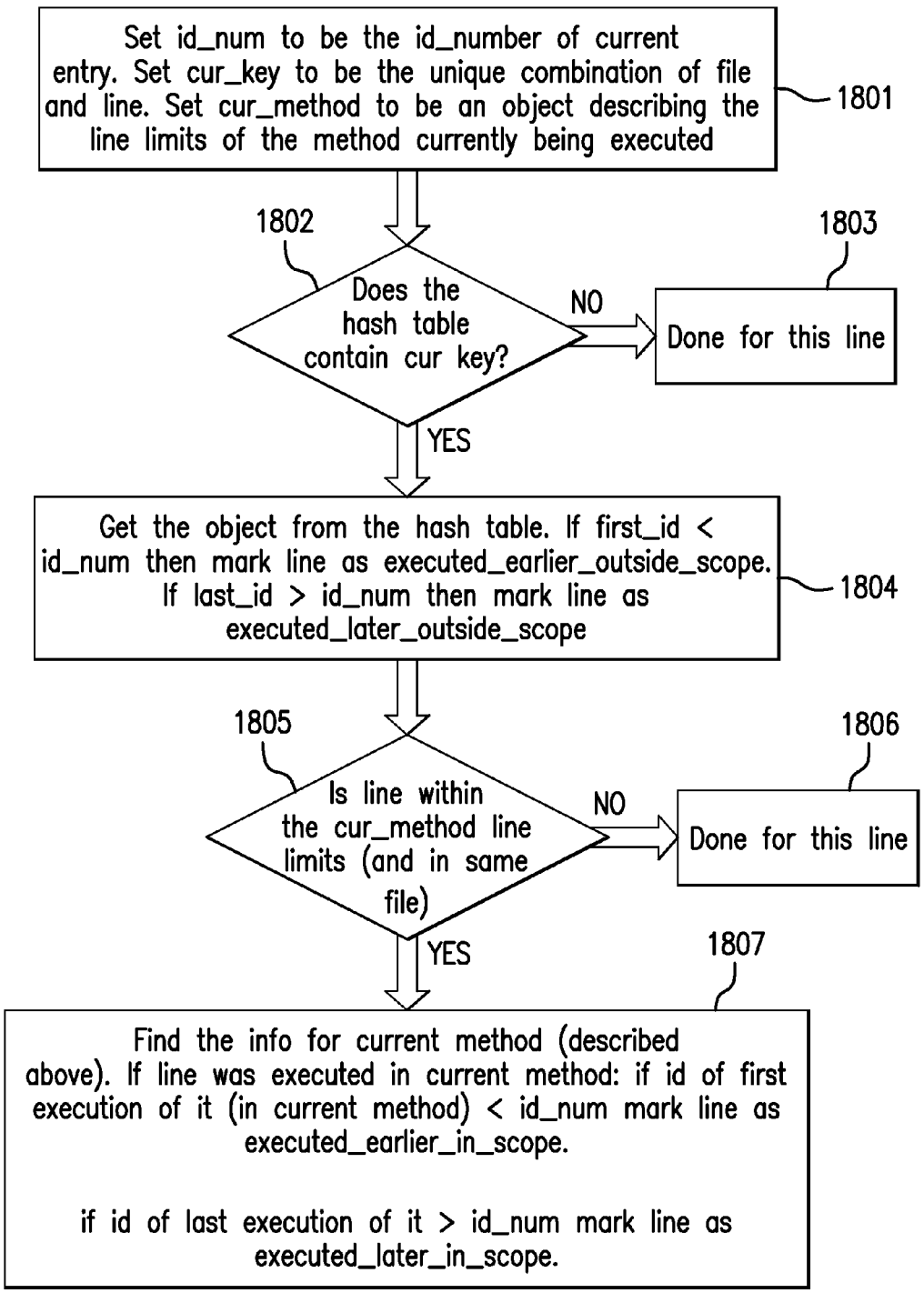
FIG. 18 is a flow diagram illustrating an exemplary embodiment of the present invention; and, FIG. 19 is a flow diagram illustrating an exemplary embodiment of the present invention.

As seen in FIG. 18, a flow for establishing execution history indicia and direct access to subsequent/precedent executions is shown. At block 1801 an id_num is set to be the id_number of a current entry. Such current entry may be the result of a break point or selection, such as, for example, by a user. The cur_key is set to be a unique combination of file and line number. The cur_method is set to be an object describing the line limits (start_id_num to end_id_num) of the method currently being executed. At block 1802, a hash table is evaluated to determine if cur_key is present. If cur_key is not present in the hash table then flow proceeds to block 1803 and the line is completed. If, however, the cur_key is already in the hash table, then flow proceeds to block 1804. At block 1804 the object having cur_key is retrieved from the hash table. If the first_id is less than the id_number of the current entry (command or line of source code) then the line is marked to have an indicia that it as executed earlier outside the scope. If the last_id is greater than id_num then the line is marked as being executed later outside the scope of the current line. Flow then proceeds to line 1805 where it is determined whether the line is within the cur_method line limits and within the same file—if no, then flow proceeds to block 1806 and processing is completed for the current line. If, however, the line is within the same method and file, then flow proceeds to block 1807. At block 1807 the information is found for the current method (described above). If the line was executed in the current method, in other words, if the id of the first execution of the instant line within the current method is less than the id_num, the line is marked to have indicia that it was executed earlier in scope. If the id of the last execution of the lie is greater than the id_num, the line is marked as being executed later in the scope.

Figure 19:
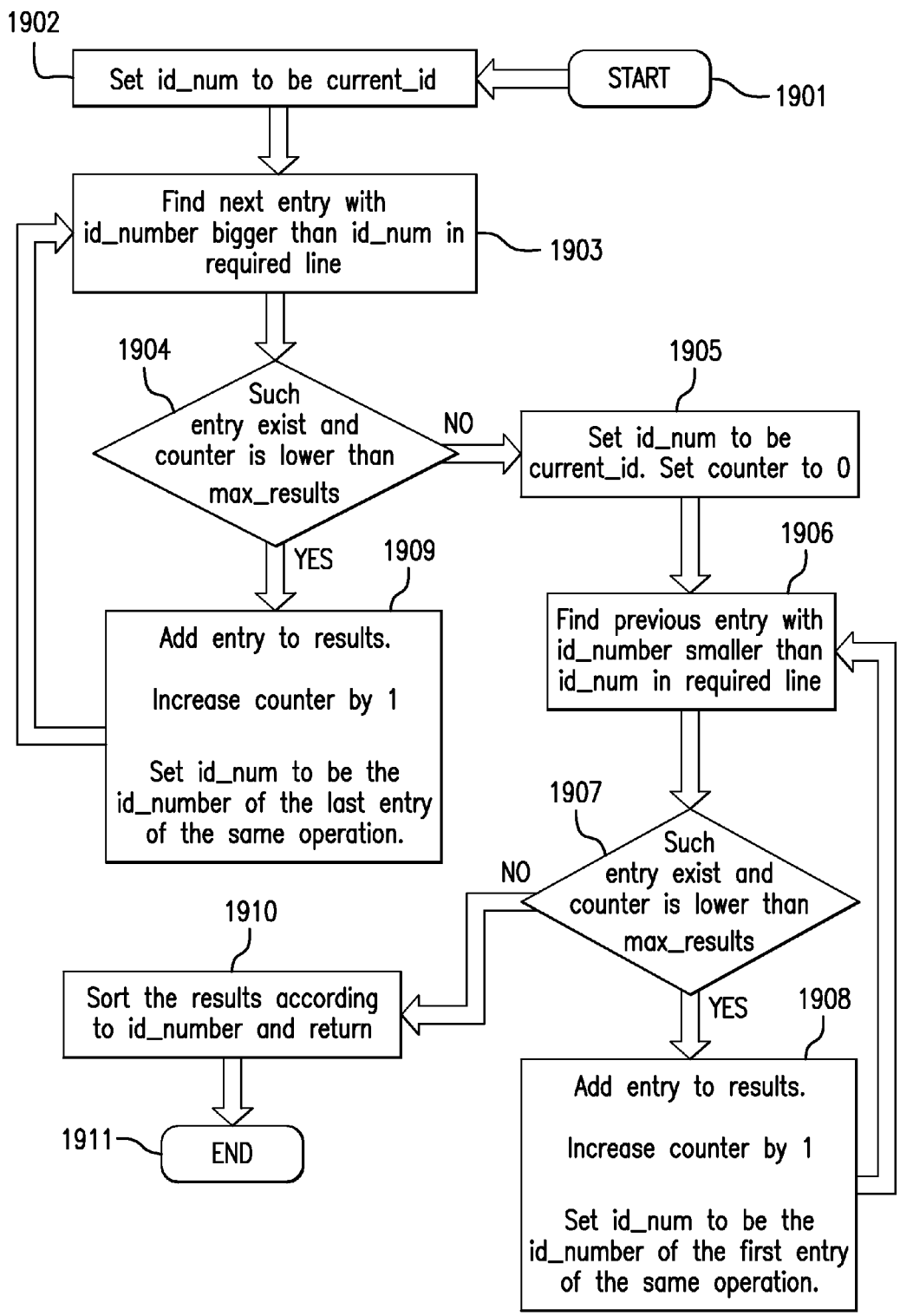

As seen in FIG. 19, at block 1901 a flow is started. At block 1902, id_num is set to be current_id. At block 1903 the next entry with id_number bigger than id_num in the required line is found. At block 1904 it is evaluated whether such entry actually exists. If the entry exists, then flow proceeds to block 1909 where the entry is added to a results tally. Such results tally may be stored in a file or a database or any suitable memory location. A counter is incremented. The id_num is set to be the id_number of the last entry of the same operation and flow returns to iterate back to block 1903. Contrastingly, if such entry as evaluated at block 1904 does not exist then flow proceeds to block 1905 where the id_num is set to be current_id and the counter is set to 0. At block 1906 the previous entry with an id_number smaller than id_num in required line is found. At block 1907 it is evaluated whether such an entry meeting those conditions exists. If an entry does exist and the counter is lower than max_results, flow proceeds to block 1908 and the entry is added to results tally and the counter is incremented. The id_num is set to be the id_number of the first entry of the same operation and flow proceeds back to iterate back through blocks 1906, 1907, and 1908. Contrastingly, if the decision at block 1907 is negative then flow proceeds to block 1910 where the results are sorted according to id_number and returned to the user. Block 1911 ends the flow.

In a software implementation, the enhanced debugging software includes a plurality of computer executable instructions, to be implemented on a computer system. Prior to loading in the computer system or firmware, the software may reside as encoded information on a computer-readable tangible medium such as a magnetic floppy disk, a magnetic tape, CD-ROM, DVD-ROM, flash memory, or any other suitable computer readable medium.

In a hardware implementation, such a system may be implemented in any suitable computer based platform known in the art. For example, the system may comprise suitable storage media and one or more dedicated processors or share one or more processors executing/controlling other functions, wherein the employed processor(s) is programmably configured with processor instructions for performing the functions described herein. Suitable circuits may also be developed to execute certain aspects of these functions.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular combinations of circuit design and implementation flows and processing steps may be reversed or interposed, all without departing from the spirit or scope of the invention as defined in the appended Claims.

What is claimed is:

1. A method for debugging source code of a computer program based on an execution history thereof, the method comprising:
   establishing a computer program defined by source code including a plurality of command lines;
   actuating a processor to sequentially execute said command lines to generate runtime data;
   capturing the runtime data in a storage device, the runtime data including an execution history of a set of runtime values for each of a plurality of program variables;
   actuating a user interface to display a spatial listing of at least a portion of said source code; and,
   automatically generating a graphic display corresponding to at least one of said program variables adaptively selected responsive to user selection of at least one said command line, said graphic display including at least a portion of said execution history of said set of runtime values for said displayed program variable;
   whereby the user selected command line of said source code is selectively cross-referenced in time to said runtime values for said program variable set thereby.

2. The method as recited in claim 1, wherein a plurality of said program variables are selectively displayed responsive to an evaluation of the user selected command line, said program variables being displayed with at least a portion of said execution history of said sets of runtime values for each of said displayed program variables.

3. The method as recited in claim 1, further comprising generating a hierarchical causality tree including a plurality of nodes, each node representing an execution of a command of said source code, the causality tree being based upon said runtime data to define at least one sequence of command executions in an execution path.

4. The method as recited in claim 3, further comprising searching the causality tree responsive to a user input, evaluating at least one node of the execution path based upon the input, and selectively displaying at least one first node identifier and a hierarchical relation thereof to a second node identifier corresponding to the user selected command.

5. The method as recited in claim 4, wherein a plurality of node identifiers defining the execution path are selectively displayed to the user.

6. The method as recited in claim 5, further comprising evaluating each node of the execution path to find a condition-matching parent node based on the user input, the parent node being evaluated to determine a plurality of children nodes not matching the condition to thereby identify a source of the condition.

7. The method as recited in claim 1, wherein said step of actuation of a user interface to display a spatial listing of at least a portion of said source code further comprises generating a plurality of execution time based indicia for each line of source code.

8. The method as recited in claim 7, wherein said execution time based indicia are selectable by a user to change a scope of said user interface to a particular execution amongst the execution history of a command line corresponding to the selected time based indicia.

9. The method as recited in claim 8, wherein the execution time based indicia further include post-execution indicia, the post-execution indicia being selectable to execute a corresponding command line and retain a current scope thereof.

10. The method as recited in claim 1, wherein a plurality of lines of said source code are selectively highlighted responsive to a common functional block relation to said selected command line.

11. The method as recited in claim 2, wherein said graphic display is rendered to include a value of each displayed program variable through each execution thereof, a sequential portion of values being visible at a time for each displayed program variable, a user interface scrolling the visible sequential portion of values amongst all execution values thereof.

12. A method for debugging source code of a computer program based on an execution history thereof, the method comprising:
    establishing a processor coupled to a memory;
    establishing in said memory a computer program defined by source code including a plurality of commands;
    actuating a processor to execute at least a portion of the commands to generate runtime data;
    capturing the runtime data in said memory, the runtime data including an execution history of at least a portion of the commands;
    actuating a user interface to display a spatial listing of at least a portion of the commands; and,
    generating a composite display to include the spatial listing of the portion of commands with a plurality of relative time-based indicia according to said execution history, the time-based indicia respectively indicating a relative temporal execution order of the commands displayed.

13. The method as recited in claim 12, further comprising actuating said user interface to display a plurality of runtime values retrieved from the runtime data responsive to a user selection of a command, wherein the runtime values are related to said selected command.

14. The method as recited in claim 12, further comprising actuating said user interface to select a command and the time-based indicia being regenerated responsive to the selection to indicate a relation between the selected command and at least one other command in the portion of commands displayed.

15. The method as recited in claim 14, wherein the relation indicated by each time-based indicia is based upon said execution history of the commands in the portion of commands displayed relative to said selected command.

16. The method as recited in claim 12, further comprising actuating said processor to generate a hierarchical causality tree including a plurality of nodes, each node representing an execution of a command of the source code, the causality tree being based upon the runtime data to define at least one sequence of command executions in an execution path, whereby a user is presented with at least one causal node identifier.

17. The method as recited in claim 16, further comprising actuating said processor to search the causality tree responsive to a user input condition, evaluating at least one node of the execution path based upon the input condition, and selectively displaying at least one first node identifier and a relation thereof to a second node identifier corresponding to the user selected command.

18. The method as recited in claim 17, wherein the user interface is actuated to selectively display a plurality of node identifiers defining the execution path to the user.

19. The method as recited in claim 18, further comprising actuating said processor to evaluate each node of the execution path to find a condition-matching parent node based on the user input, the parent node having no children nodes matching the condition, whereby a source of the input condition is identified to the user.

20. The method as recited in claim 12, wherein said time-based indicia are selectable by a user to change a scope of said user interface to a particular execution of a command.

21. The method as recited in claim 12, wherein the time-based indicia further includes post-execution indicia, the post-execution indicia being selectable to execute a corresponding command and retain a current scope.

22. The method as recited in claim 12, wherein said user interface is actuated to selectively indicate relation between a plurality of commands of said source code and a selected command responsive to selection thereof.

23. A system for debugging source code of a computer program based on an execution history thereof, the system comprising:
    a memory, said memory including a computer program defined by source code, said source code including a plurality of command lines;
    a processor coupled to said memory, said processor sequentially executing said command lines to generate runtime data;
    the processor executing to capture the runtime data in said memory, the runtime data including an execution history of a plurality of sets of runtime values for a respective plurality of program variables; and,
    a user interface coupled to said processor to generate a display including:
      a spatial listing of at least a portion of said source code;
      at least one of said program variables adaptively selected responsive to user selection of at least one said command line; and,
      at least a portion of said execution history of runtime values for said displayed program variable, whereby the user selected command line of said source code is selectively cross-referenced in time to said runtime values for said program variable set thereby.

* * * * *